(12) United States Patent
Gindele

(10) Patent No.: US 6,636,646 B1
(45) Date of Patent: Oct. 21, 2003

(54) DIGITAL IMAGE PROCESSING METHOD AND FOR BRIGHTNESS ADJUSTMENT OF DIGITAL IMAGES

(75) Inventor: Edward B. Gindele, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 621 days.

(21) Appl. No.: 09/619,998

(22) Filed: Jul. 20, 2000

(51) Int. Cl.$^7$ ................................................. G06K 9/00
(52) U.S. Cl. ................. 382/274; 382/162; 382/167; 382/165; 382/275; 358/520; 358/518; 358/515
(58) Field of Search ................. 382/274, 275, 382/162, 165, 167; 358/461, 1.9, 516, 520, 518, 515; 250/205; 345/20, 63, 77, 581–619, 596–599, 690–697; 348/251, 254; 396/100

(56) References Cited

U.S. PATENT DOCUMENTS

| 4,464,676 | A | * | 8/1984 | Russell et al. | 348/701 |
| 4,984,013 | A | | 1/1991 | Terashita | 355/38 |
| 5,016,043 | A | | 5/1991 | Kraft et al. | 355/38 |
| 5,436,661 | A | * | 7/1995 | Yamamoto et al. | 348/264 |
| 6,271,826 | B1 | * | 8/2001 | Pol et al. | 345/589 |
| 6,437,914 | B1 | * | 8/2002 | Hall et al. | 359/457 |
| 2001/0007599 | A1 | * | 7/2001 | Iguchi et al. | 382/274 |
| 2001/0007921 | A1 | * | 7/2001 | Hayashi | 600/476 |
| 2001/0009269 | A1 | * | 7/2001 | Hayashi | 250/458.1 |
| 2002/0131783 | A1 | * | 9/2002 | Gassmann | 396/429 |
| 2002/0175993 | A1 | * | 11/2002 | Ueno et al. | 348/68 |

OTHER PUBLICATIONS

Automatic Color Printing Techniques, Image Technology, Apr./May, 1969, J. Hughes, J.K. Bowker.
Pixel classification based on gray level and local busyness, IEEE Transactions on Pattern Analysis and Machine Intellegence, vol. PAMI–4, No. 1, pp 79–84, 1982, P.A. Dondes, A. Rosenfeld.

* cited by examiner

Primary Examiner—Bhavesh M. Mehta
Assistant Examiner—Barry Choobin
(74) Attorney, Agent, or Firm—William F. Noval

(57) ABSTRACT

A method of calculating a brightness balance value for an original image having contribution from the visible spectrum of wavelengths including red, green, and blue wavelengths comprising the steps of a) generating one or more pseudo luminance values from the original image wherein (i) the pseudo luminance value contribution from the red wavelengths is greater than or equal to the contribution from the green wavelengths;
  (ii) the pseudo luminance value contribution from the green wavelengths is greater than the contribution from the blue wavelengths;
  (iii) the pseudo luminance value contribution from the red and green wavelengths are greater than zero; and
  (iv) the pseudo luminance value contribution from the blue wavelengths is greater than or equal to zero; and
  b) using the pseudo luminance values to calculate a brightness balance value.

71 Claims, 14 Drawing Sheets

(camera exposure configuration)

(brightness scene balance module)

(brightness prediction module)

DIGITAL IMAGE PROCESSING METHOD AND FOR BRIGHTNESS ADJUSTMENT OF DIGITAL IMAGES

FIELD OF THE INVENTION

The invention relates generally to the field of image processing and more particularly to image processing systems which adjust the brightness characteristics of a digital image.

BACKGROUND OF THE INVENTION

Many digital imaging systems include three main components: a mechanism for generating the source digital imagery, a mechanism for processing the digital image data, and a mechanism for visualizing the imagery. As such, many digital imaging systems employ more than one image processing method, or algorithm, designed to enhance the visual quality of the final rendered output. In particular, image processing methods of interest are methods for adjusting the overall balance, or brightness of digital images.

In the journal article *Automatic Color Printing Techniques* published in Image Technology, April/May, 1969, the authors J. Hughes and J. K. Bowker describe an automatic method of printing color negative film onto to photographic paper. In this article, Hughes et al. compare their method to the predominant method of the time, namely large area transmission density (LATD). The LATD method, which involves sensing the color of the overall film negative, is described as failing to accurately predict the color balance for natural scenes which are dominated by a single color. The LATD measurements are reliable only when the scene is composed of a random sampling of red, green and blue objects. The new method described by Hughes et al involved the steps of scanning the film negative with a red, green, and blue sensitive line scanner capable of resolving reasonable spatial detail, developing two color-difference signals by subtracting the green signal from the red signal and the blue signal from the red signal, forming a spatial derivative of the color-difference signals, calculating an average color balance for the film negative by rejecting image region not exhibiting color activity, and exposing the film negative onto photographic paper using the calculated color balance to adjust the overall color of the print. The differentiation operation employed by Hughes and Bowker involves the calculation of subtracting adjacent signal values i.e. forming a gradient signal. Hughes and Bowker identified a link between regions of images which exhibit spatial activity and the likelihood of those image regions as being good estimates of color balance.

In U.S. Pat. No. 5,016,043, Kraft et al. disclose a method of color balancing and brightness balancing for photographic optical printers. In the disclosure photographic film negative originals are scanned photoelectrically by regions and three color densities are determined for each scanning regions. Each scanning region has multiple photoelectric response values produced with a high resolution scanning system. A detail contrast parameter describing the detail contrast in the scanning region is calculated by finding the maximum and minimum values taken form the multiple photoelectric response values. The detail contrast parameters for each of the scanning regions are evaluated together with the color densities of the scanning regions for the determination of the exposure light quantities. These exposure values are used to control the amount of light passing through the photographic film negative onto photographic paper and relate to the average density of the photographic film sample. In particular, in the correction of densities, scanning regions with higher detail contrasts are considered stronger than those with lower density contrasts, while color corrections are carried out in exactly the opposite manner.

In U.S. Pat. No. 4,984,013 T. Terashita describes a method of calculating the amount of exposing light for a color photographic film negative involving the steps scanning the original negative in red, green, and blue color sensitivities photoelectrically, calculating color density difference values for the red, green and blue signals of adjacent pixel values, comparing the color density difference values to a threshold value, classifying the pixels as either belonging to subject or background regions based on color difference values, calculating a printing exposure based on a statistical quantity sampled from the subject region of pixels. Alternately, the method describes the use of a color chrominance signal for forming the color density difference values. The method described by Terashita builds on the principles described by Hughes and Bowker by extending the idea of using spatial derivatives to calculate brightness balance for printing exposure control. However, the method described by Terashita does not teach a method for adjusting the brightness of a digital image. Furthermore, the formulation of the pixel classification on the basis of color and/or chrominance signals rather than luminance signals makes the method more susceptible to noise.

All the methods described above use either the red, green, blue image channels or color channel differences as the basis signal from which to derive brightness modifications. The use of a luminance channel derived from the red, green, blue image channels or sensed directly for the purposes of deriving brightness modification information is also well known in the art and practiced for many years. In all these methods, the contribution of green light is always equal to or greater than the contribution of red light. While all these methods work well, blue image channel information does not contribute to the predictability of the brightness information to the same degree as either the red or green image channels. In addition, the red image channel can yield better predictability than the green image channel.

SUMMARY OF THE INVENTION

Object of the invention—What is needed is an image signal derived from the red, green, and blue image channels which emphasizes the red channel more than the green channel and the green channel more than the blue channel to take advantage of the improved predictability of the red channel information for the purposes of deriving brightness prediction information.

DETAILED DESCRIPTION OF THE INVENTION

A digital image is comprised of a one or more digital image channels. Each digital image channel is comprised of a two-dimensional array of pixels. Each pixel value relates to the amount of light received by an imaging capture device corresponding to the geometrical domain of the pixel. For color imaging applications a digital image will typically consist of red, green, and blue digital image channels. Other configurations are also practiced, e.g. cyan, magenta, and yellow digital image channels. Motion imaging applications can be thought of as a time sequence of digital images. Those skilled in the art will recognize that the present invention can be applied to, but is not limited to, a digital image for any of the above mentioned applications.

Although the present invention describes a digital image channel as a two dimensional array of pixels values arranged by rows and columns, those skilled in the art will recognize that the present invention can be applied to mosaic (non rectilinear) arrays with equal effect. Those skilled in the art will also recognize that although the present invention describes replacing original pixel values with brightness adjusted pixel values, it is also trivial to form a new digital image with the brightness adjusted pixel values and retain the original pixel values.

Figure 1:
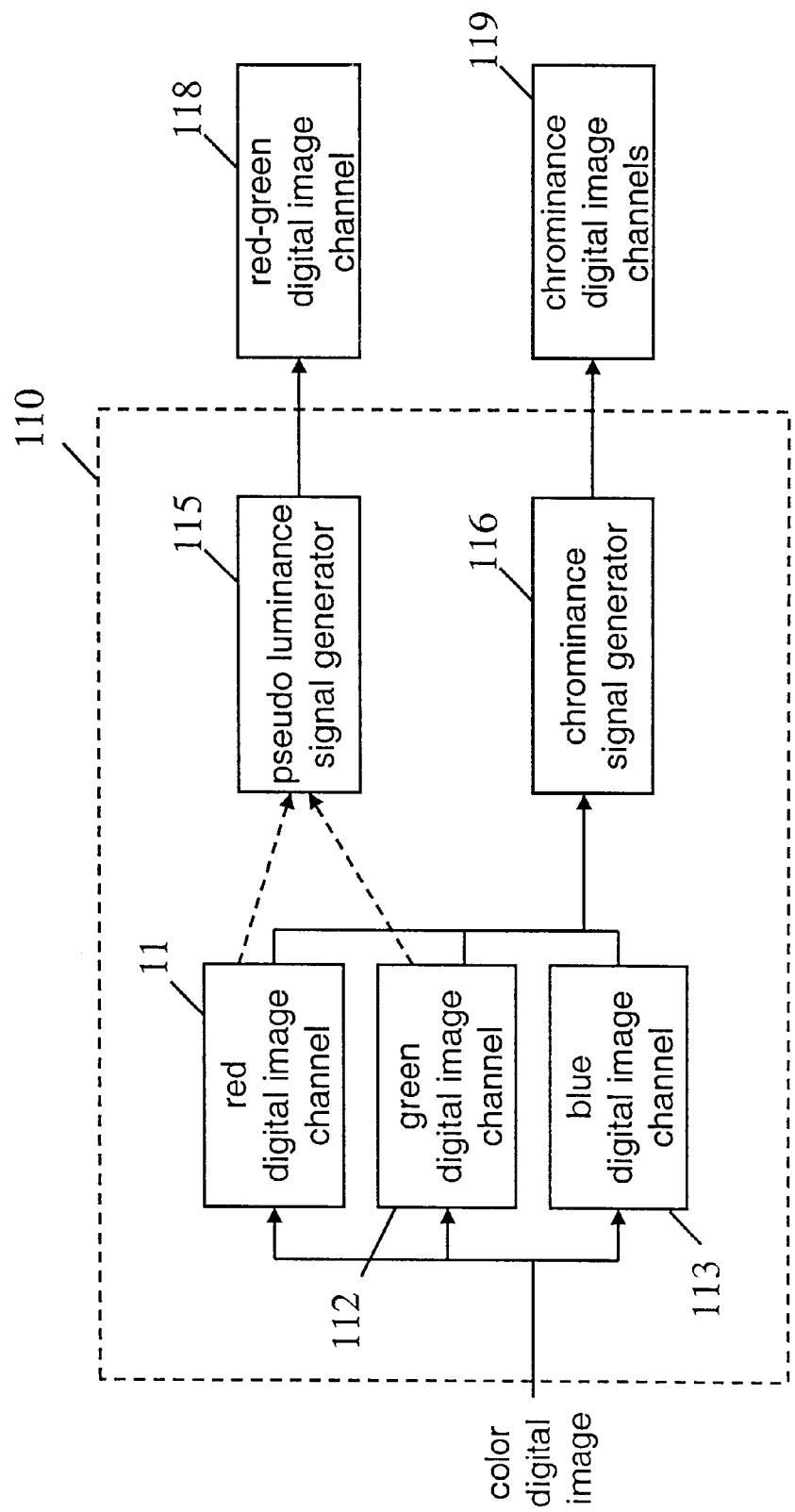
FIG. 1 is a block diagram showing the formation of the red-green digital image channel utilized by the present invention.

FIG. 1 shows a block diagram of a luminance-chrominance module 110 illustrating the present invention. A source digital image including red, green, and blue digital image channels (items 111, 112, and 113 respectively) is shown as input to the luminance-chrominance module 110. The pseudo luminance signal generator 115 receives the red, green, and blue digital image channels and produces a pseudo luminance digital image channel. The chrominance signal generator 116 receives the red, green, and blue digital image channels and produces two chrominance digital image channels 119. The use of the red-green digital image channel and the chrominance digital image channels is described in more detail below. An important aspect of the present invention is the use of the red and green digital image channels to produce the pseudo luminance digital image channel with little or no contribution from the blue digital image channel. The pseudo luminance digital image channel, when analyzed for the purposes of predicting scene brightness is superior to other combinations of the red, green, and blue digital image channels which do include significant contributions from blue digital image channel.

General Description of a Digital Imaging System Application

Figure 2:
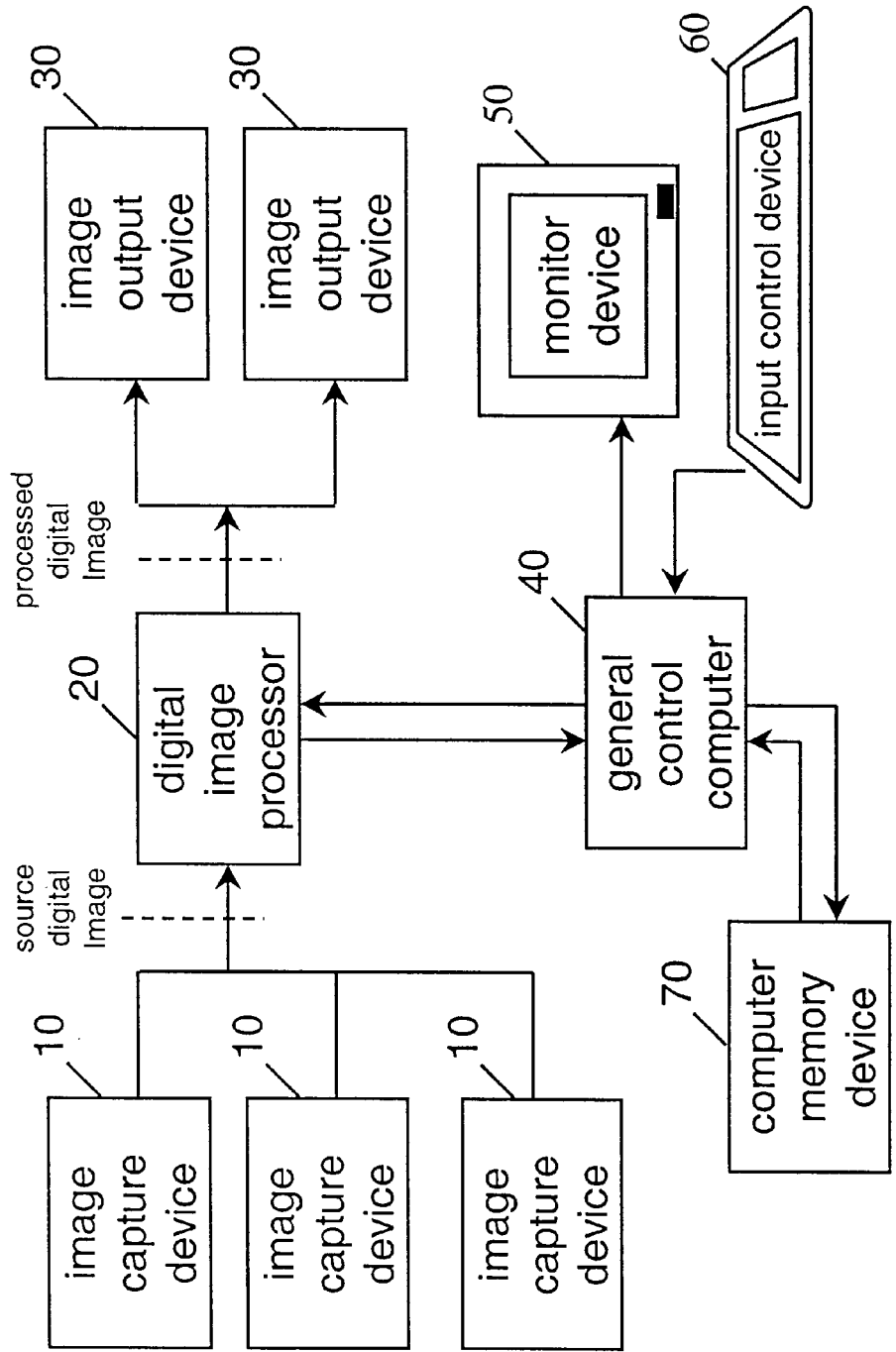
FIG. 2 is a block diagram showing an image processing system suitable for practicing the present invention.

The present invention may be implemented in computer hardware. Referring to FIG. 2, the following description relates to a digital imaging system which includes an image capture device 10, a digital image processor 20, an image output device 30, and a general control computer 40. The system may include a monitor device 50 such as a computer console or paper printer. The system may also include an input device control for an operator such as a keyboard and or mouse pointer. Still further, as used herein, the present invention may be implemented as a computer program and may be stored in a computer memory device 45 i.e. a computer readable storage medium, which may comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. Before describing the present invention, it facilitates understanding to note that the present invention is preferably utilized on any well-known computer system, such as a personal computer.

Multiple capture devices 10 are shown illustrating that the present invention may be used for digital images derived from a variety of imaging devices. For example, FIG. 2 may represent a digital photofinishing system where the image capture device 10 is a conventional photographic film camera for capturing a scene on color negative or slide film and a film scanner device for scanning the developed image on the film and producing a digital image. The digital image processor 20 provides the means for processing the digital images to produce pleasing looking images on the intended output device or media. Multiple image output devices 30 are shown illustrating that the present invention may be used in conjunction with a variety of output devices which may include a digital photographic printer and soft copy display. The digital image processor 20 processes the digital image to adjust the overall brightness and/or tone scale of the digital image in a manner such that a pleasing looking image is produced by a image output device 30. The interaction between these processing steps is explained in more detail below.

General Description of a Internet-based Digital Imaging System Application

The present invention may be implemented with multiple computers connected via a computer network such as, but not limited to the internet accessed via the World Wide Web. As part of the digital image processing procedures involved in the practice of the present invention, two central elements are embodied: 1) the calculation of a brightness balance value derived from the pixel values contained in the source digital image and 2) the transformation of the source digital image using the brightness balance value to adjust its brightness. One or both of these central elements may be achieved in a single computer, however, it is possible for the calculation of the brightness balance value and the transformation based on this value to be performed on different computers.

Figure 3:
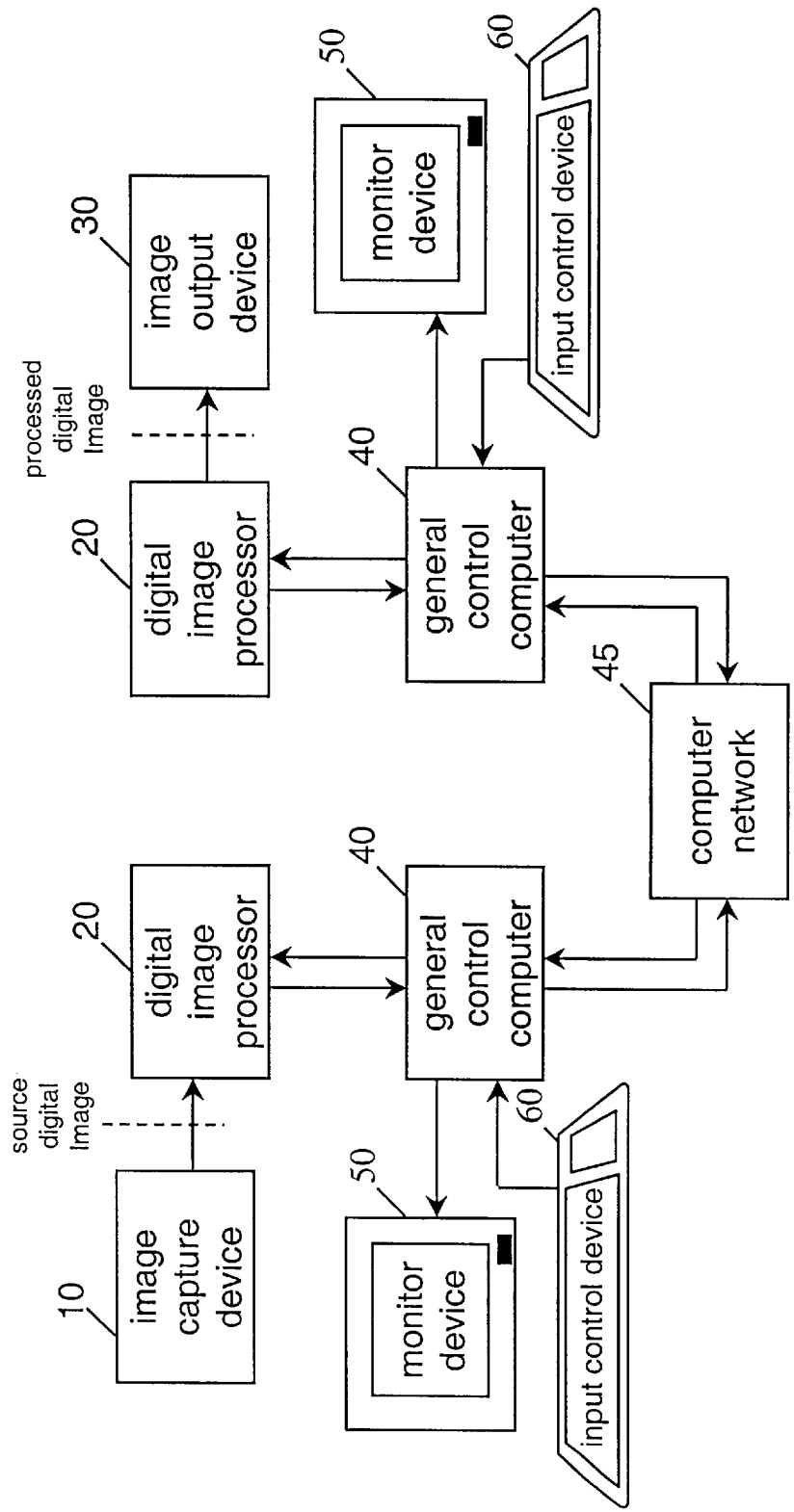
FIG. 3 is a block diagram showing an Internet computer image processing system suitable for practicing the present invention.

The diagram illustrated in FIG. 3 shows two computer systems as depicted in FIG. 2 connected together via a computer network 45. Referring to FIG. 3, one of the computer systems is shown with an image capture device 10 connected to its digital image processor 20 while the other computer system is shown with an image output device 30 connected to its digital image processor 20.

The image capture device 10 produces a digital image which is received and processed by the connected digital image processor 20. A brightness balance value is calculated in the digital image processor 20. The source digital image and the brightness balance value are transmitted to a second computer system over the computer network 45. The digital image processor 20 of the second computer system receives the source digital image and uses the brightness balance value to adjust the overall brightness of the digital image in a manner such that a pleasing looking image is produced by a image output device 30.

Although two computer systems are shown in FIG. 3 the present invention may be practiced with more than two. It is possible to practice the present invention with a first computer system capturing the source digital image, the source digital image received by a second computer system which calculates the brightness balance value, a third computer system receiving the brightness balance value and the source digital image which adjusts the brightness of the digital image, and a fourth computer system receiving the brightness adjusted digital image which produces a visual display of the processed digital image.

The brightness balance value is an example of image meta-data i.e. a piece of non-pixel information related to a digital image. Image meta-data may be used for such purposes as, but not limited to, conveying information about how the digital image was captured, adding context to the meaning of the digital image such as the photographer's annotation, or adding analysis information about the digital image. The present invention transmits the brightness balance value as a piece of image meta-data over a computer network to enable a different computer system to use the image meta-data to adjust the brightness of the digital image.

General Description of a Camera Exposure System Application

Figure 4:
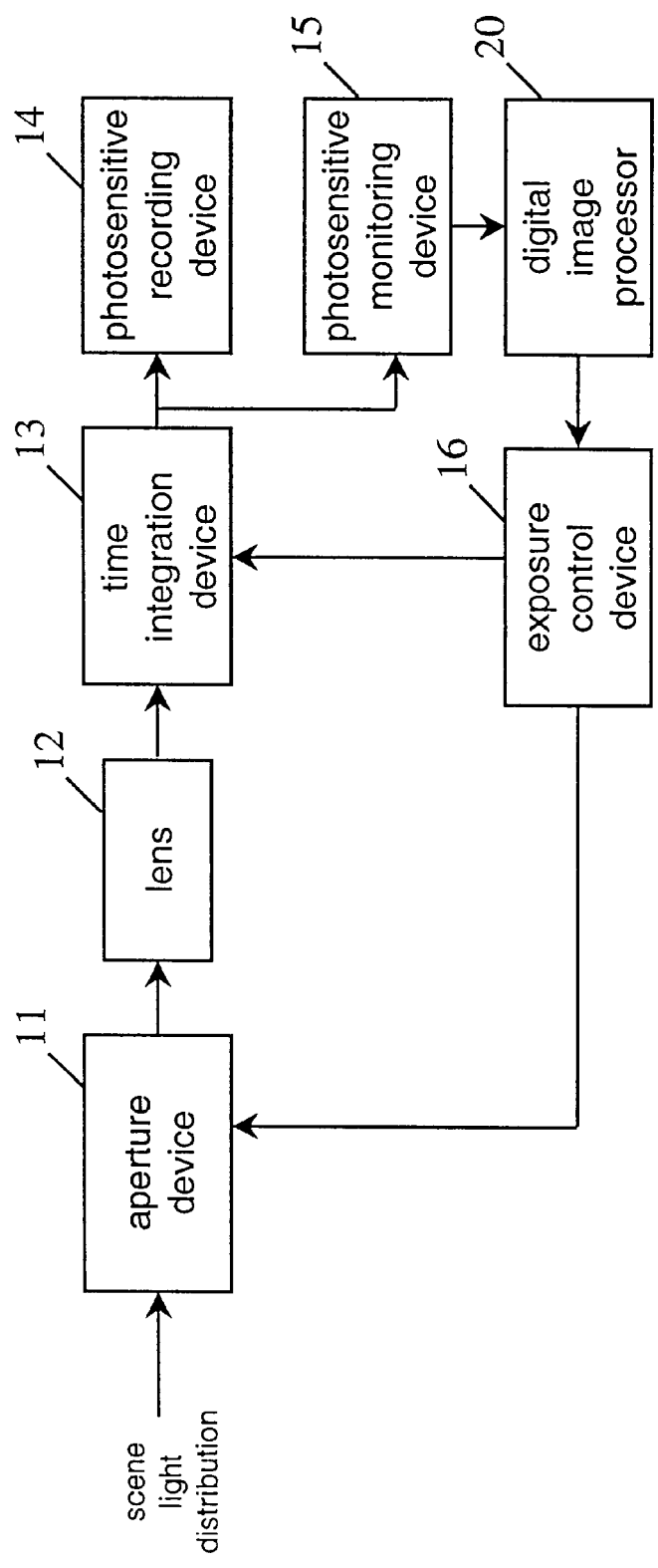
FIG. 4 is a block diagram showing a camera exposure system suitable for practicing the present invention.

The present invention may be implemented in a photographic camera system as a component for exposure control. Examples of a photographic camera system include, but is not limited to, a photographic film camera, a digital still frame camera, a video camera, a digital video camera, and a motion picture camera. Referring to FIG. 4, a photographic camera system is shown which includes an aperture device 11, a lens 12, a time integration device 13, a photosensitive recording device 14, a photosensitive monitoring device 15, an exposure control device 16, and a digital image processor 20.

The scene light distribution is focuses by the lens 12 onto the a photosensitive recording device 14 forming a focal plane image of the original scene. The photosensitive recording device 14 receives the light and records the intensity of the imaged light distribution. The photosensitive recording device 14 may be, but is not limited to, a photographic film or a solid state CCD imaging electronic device. The amount of light received by the photosensitive recording device 14 is regulated by the aperture device 11 and the time integration device 13. The aperture device 11 regulates the amount of light by varying the effective diameter of the lighting passing portion of the lens 12. The time integration device 13 regulates the amount of light received by varying the length of time the focused light remains on the photosensitive recording device 14. For a photographic film camera, the time integration device 13 may be a shutter which opens during the imaging operation and remains closed otherwise. The exposure control device 16 regulates both the aperture device 11 and the time integration device 13. For a photographic film camera system, the photosensitive monitoring device 15 may be an electronic photosensitive device with a plurality of photosensitive elements with a reduced spatial resolution sensitivity compared with the photographic film. Also included in the photosensitive monitoring device 15 is a means for converting the sensed electrical response of the photosensitive elements into digital pixel values. For a digital still frame camera system the photosensitive monitoring device 15 may be a separate device, similar to the photographic film camera system, or may be the photosensitive recording device 14 itself. For either system, the photosensitive monitoring device 15 generates a source digital image which is received by the digital image processor 20.

The exposure control device 16 receives a brightness balance value from the digital image processor 20. The photographic camera system must be calibrated in order for the exposure control device 16 to properly interpret the brightness balance value. The exposure control device have knowledge of the speed value Sv of the photosensitive recording device 14. The exposure control device 16 regulates the diameter of the aperture device 11 and the length of exposure time of the time integration device 14 in accordance with the following mathematical relationship;

$$Av+Tv=Bv+Sv.$$

where the aperture value Av is given by the equation:

$$Av=\log_2(Fn^2)$$

where the Fn term is the photographic F number of the lens-aperture, the time value Tv is given by the equation:

$$Tv=\log_2(\tau)$$

where the T term is the regulated length of exposure time in seconds of the time integration device 13, and the term Sv is the speed value given by the equation:

$$Sv=\log_2(\pi s)$$

where s is the ISO photographic speed rating of the photosensitive recording device 14. The brightness value Bv is given by the formula:

$$Bv=C_1 b+C_0$$

where $C_1$ and $C_0$ are numerical calibration constants and b represent the brightness balance value received by the digital image processor 20.

The exposure control device may have more than one mode of operating, however, two modes are the most useful. In the aperture Av mode, the exposure control device 16 allows the operator of the camera to set the aperture value Av while the exposure control device 16 the sets the time value Tv by the equation:

$$Tv=Bv+Sv-Av.$$

In the time Tv mode, the exposure control device 16 allows the operator of the camera to set the time value Tv while the exposure control device 16 the sets the aperture value Av by the equation:

$$Av=Bv+Sv-Tv.$$

The present invention may be used with complex relationships for determining the camera exposure.

In an alternative embodiment of the present invention, the photosensitive monitoring device 15 is a single element photocell. An optical filter with a red-green wavelength emphasis is placed in a position between the photosensitive monitoring device 15 and the scene light distribution. The output of the single element photocell produces the brightness balance value as described above.

General Description of a Printer Exposure System Application

Figure 5:
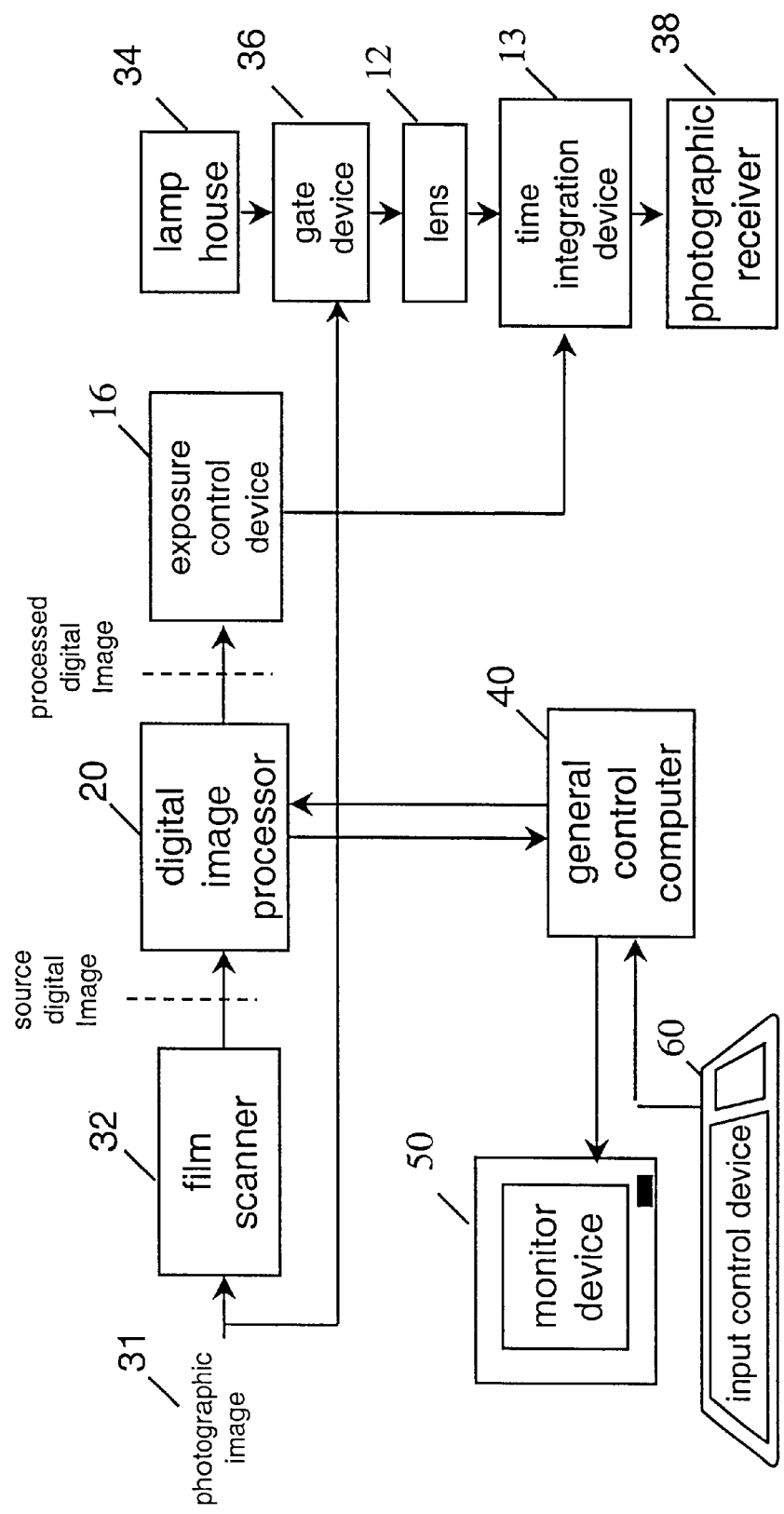
FIG. 5 is a block diagram showing a printing exposure system suitable for practicing the present invention.

The present invention may be implemented in computer hardware. Referring to FIG. 5, the following description relates to an optical printing system. A photographic film image 31 is received by a film scanner 32 which produces a source digital image relating to the spatial density distribution of the photographic image. Some examples of a photographic image that may by used with the present invention are a photographic film negative, a photographic slide film transparency, and a reflection paper print. This source digital image is received by a digital image processor 20 which produces a brightness balance value. The digital image processor 20 may be connected to a general control computer 40 under operator control from an input control device 60. The monitor device 50 displays diagnostic information about the optical printing system. The photographic image is positioned in a gate device 36 which holds the photographic image in place during the exposure. A lamp house 34 provides the illumination source which is transmitted through the photographic image 31 and focuses by a lens 12 onto photographic receiver 38. The preferred embodiment of the present invention uses photographic paper as the photographic receiver 38, however, the present invention may be practiced with other types of photographic receivers such as, but not limited to, photographic film negatives or photographic slide film. The time integration device 13 opens and closes a shutter for a variable length of time allowing the focused light from the lamp house 34 to expose the photographic receiver 38. The exposure control device 16 receives a brightness balance value from the digital image processor 20. The exposure control device 16 uses the brightness balance value to regulate the length of time the shutter of the time integration device stays open.

The exposure control device 16 must be calibrated for the intensity of the lamp house 34 and the photo sensitivity of the photographic receiver 38. The mathematical relationship for the length of time t required for a proper printing exposure is given by $$t = D_1 10^{(D_2 b + D_3)} + D_0$$

where $D_1$ $D_2$, D3, and $D_0$ are numerical calibration constants, and b is the brightness balance value.

In an alternative embodiment of the present invention, a single element photocell photosensitive monitoring device 15 is used to sense the photographic image 31. An optical filter with a red-green wavelength emphasis is placed in a position between the photocell and the photographic image 31. The output of the single element photocell produces the brightness balance value as described above.

General Description of a Digital Image Processor 20

Figure 6:
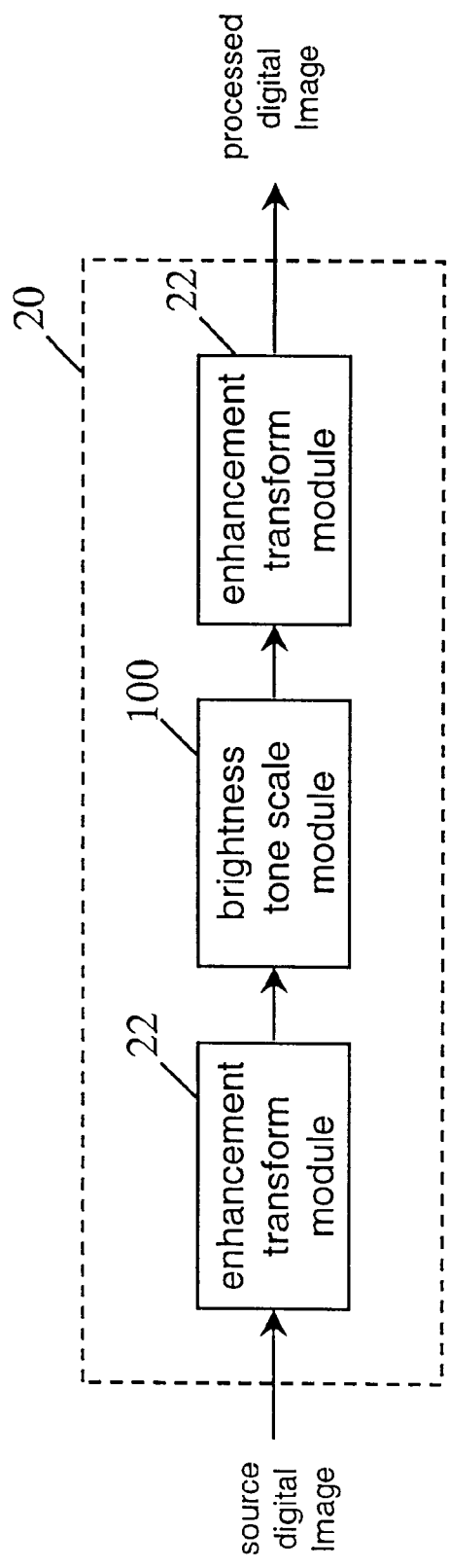
FIG. 6 is a block diagram showing image processing according to one embodiment of the present invention.

The digital image processor 20 shown in FIG. 2 is illustrated in more detail in FIG. 6. The general form of the digital image processor 20 employed by the present invention is a cascaded chain of image processing modules. The source digital image is received by the digital image processor 20 which produces on output a processed digital image. Each image processing module contained within the digital image processor 20 receives a digital image, modifies the digital image or derives some information from the digital image, and passes its output digital image to the next image processing module. Two enhancement transform modules 22 are shown as the first and last image processing modules within the digital image processor 20 to illustrate that the present invention can be used in conjunction with other image processing modules. Examples of enhancement transform modules 22 might include, but are not limited to, modules designed to sharpen spatial detail, remove noise, enhance color, and enhance the tone scale of a digital image.

Preferred Digital Image Processor 20

Figure 7:
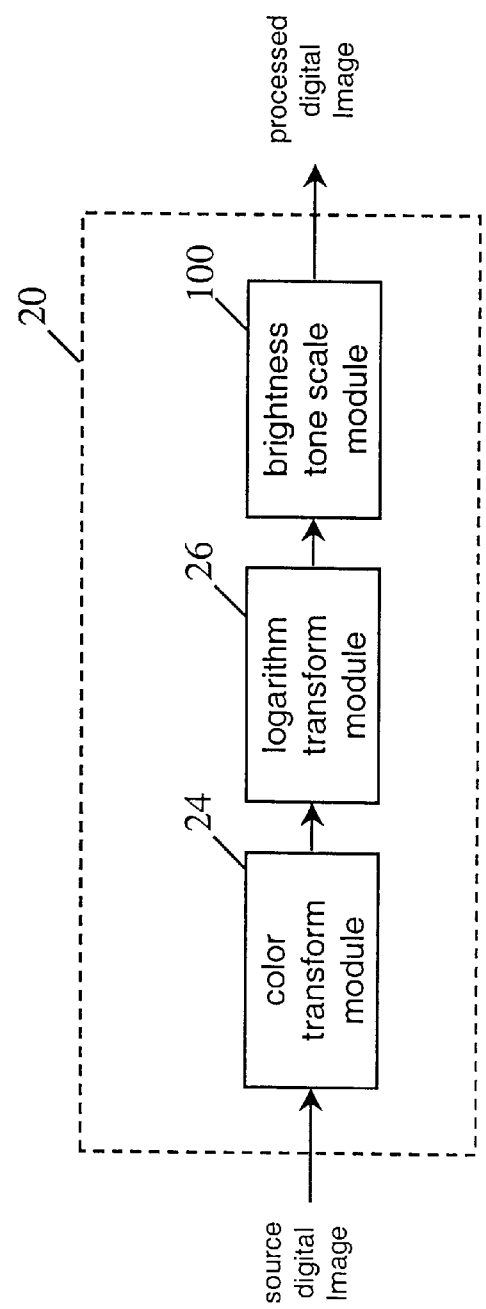
FIG. 7 is a block diagram showing image processing according to a preferred embodiment the present invention.

The cascaded chain of image processing modules employed by the present invention is shown in FIG. 7. The source digital image produced by the capture device 10 is received by a color transform module 24. The output digital image produced by the color transform module 24 is received by the logarithm transform module 26. The output digital image produced by the logarithm transform module 26 is received by the brightness tone scale module 100. The output digital image produced by the brightness tone scale module 100 constitutes the processed digital image produced by the digital image processor 20 shown in FIG. 2.

Details of the Color Transform Module 24

A characteristic of the digital image produced by a capture device 10 which can impact the effectiveness of the present invention is the color space metric associated with the capture devices which produce color digital images. Typically the capture device 10 incorporates three color spectral filters which determine the relative amounts of colored light received by the photosensitive transducer elements. Depending on the characteristics of the spectral filters, better results may be achieved with the present invention if a color transform is applied to the digital image preceding the application of the brightness tone scale module 100. Although the application of a color transform is not required to practice the present invention, optimal results may be achieved if a color transform is applied based on the spectral characteristics of the input and/or output devices.

The color transform method employed by the present invention is a 3 by 4 matrix transformation. This transformation generates new color pixel values as linear combinations of the input color pixel values. The input color digital image consists of a red, green, and blue digital image channels. Each digital image channel contains the same number of pixels. Let $R_{ij}$, $G_{ij}$, and $B_{ij}$ refer to the pixel values corresponding to the red, green, and blue digital image channels located at the $i^{th}$ row and $j^{th}$ column. Let $R'_{ij}$, $G'_{ij}$, and $B'_{ij}$ refer to the transformed pixel values of the output color digital image. The 3 by 4 matrix transformation relating the input and output pixel values is as follows:

$$R'_{ij} = \tau_{11}R_{ij} + \tau_{12}G_{ij} + \tau_{13}B_{ij} + \tau_{10}$$

$$G'_{ij} = \tau_{21}R_{ij}\tau_{22}G_{ij} + \tau_{23}B_{ij} + \tau_{20}$$

$$B'_{ij} = \tau_{31}R_{ij} + \tau_{32}G_{ij} + \tau_{33}B_{ij} + \tau_{30}$$

where the $T_{mn}$ terms are the coefficients of the 3 by 4 matrix transformation. These twelve numbers are specific to the spectral characteristics of the capture device 10 and the intended image output device 30 shown in FIG. 2.

Different methods exist for applying a color transform to a digital image, e.g. a 3-dimensional LUT may achieve even better results albeit at greater computational cost. If the $\tau_{10}$, $\tau_{20}$ and $\tau_{30}$ values are set to zero a simplified 3 by 3 matrix equation results. For the purposes of the present invention, a 3 by 3 matrix transform, 3 by 4 matrix transform, and a 3-dimensional LUT will all be considered examples of a color transform.

Details of the Logarithm Transform Processor 26

A characteristic of the digital image produced by a capture device 10 which can impact the effectiveness of the present invention is the code value domain associated with capture device which produce digital images. Typically the capture device 10 incorporates a photosensitive transducer element which converts the imaged light into an analog electrical signal. An analog-to-digital converter device is then used to transform the analog electrical signal into a set of digital code values. These digital code values constitute the numerical pixel values of the output digital image produced by the capture device 10. The code value domain characteristic of a capture device 10 describes the mathematical relationship between the output digital code values and the input intensity of received light.

Many photosensitive transducer elements have a linear characteristic response, i.e. the electrical analog signal produced is linearly proportional to the intensity of received light. Many analog-to-digital converter devices have a linear characteristic response, i.e. the digital code values produced are linearly proportional to the intensity of received electrical analog signal. If a linear transducer element and a linear analog-to-digital converter are employed by a capture device the resulting output code values will have a linear relationship with the intensity of the received light. Thus the digital images produced by capture devices which exhibit this linear relationship have numerical pixel values which have a linear relationship with the original intensity of light. Such digital images will be termed to have a linear code value domain property.

The present invention may be applied to digital images which have a linear code value domain property. However, better results are obtained with the present invention if the input digital image has a logarithmic code value domain property, i.e. the numerical pixel values have a logarithmic relationship with the original intensity of light. The logarithm transform module 26 shown in FIG. 7 is employed to change the code value domain property of the digital image input to the brightness tone scale module 100. The logarithm transform module 26 generates a look-up-table (LUT) transform populated with numerical values which have a logarithmic relationship to the LUT indices. Let $p_{ij}$ refer to the pixel values corresponding to a digital image channel located at the $i^{th}$ row and $j^{th}$ column. Let $p'_{ij}$ refer to the transformed pixel values of the output color digital image produced with the LUT transform. The LUT transform relating the input and output pixel values is as follows:

$$p'_{ij} = LUT[p_{ij}]$$

where the [ ] notation refers to the LUT indexing operation, i.e. the output pixel value $p'_{ij}$ is given by the numerical value stored in the LUT at the index given by the input pixel value $p_{ij}$. The values stored in the LUT may be computed by the following mathematical relationship:

$$LUT[k] = L_0 + L_1 \log(k + k_0)$$

where the numerical constants $L_0$ and $L_1$ are used to determine the scale the output pixel values and the constant $k_0$ is used to avoid calculating the logarithm of zero.

The mathematical operation performed by the logarithm transform module 26 is an example of single valued function transform, i.e. each input value has a single corresponding output value. This operation may be implemented as a succession of mathematical operations (add, log, multiple, add) in computer hardware or software. However, for large digital images the same operation is more computationally efficient implemented as a LUT transformation. For the purposes of the present invention, the LUT implementation and the succession of mathematical operations implementation will be referred to as logarithmic transforms.

Details of the Preferred Embodiment of the Brightness Tone Scale Module

Figure 8:
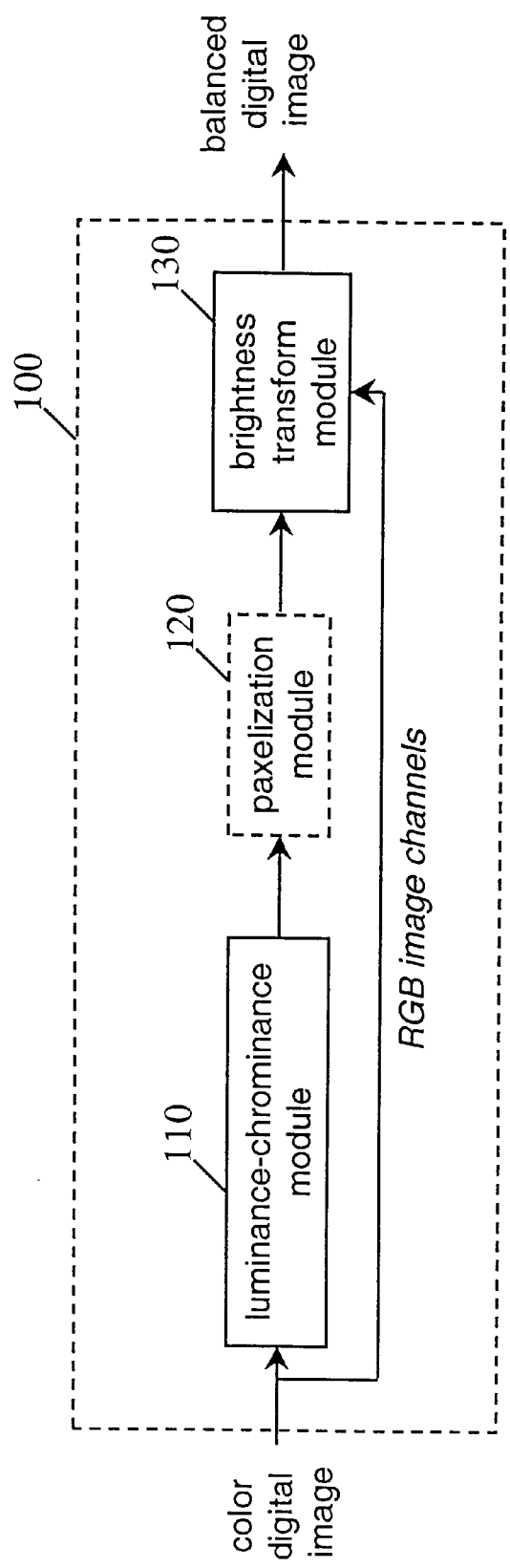
FIG. 8 is a block diagram showing the brightness tone scale module according to the preferred embodiment of the present invention.

The brightness tone scale module 100 depicted in FIG. 7 is shown in more detail in FIG. 8. The brightness tone scale module 100 performs the tasks of analyzing the source digital image to determine if it is too dark or too light, generating a corresponding brightness tone scale function LUT, and applying the brightness tone scale function LUT to the source digital image to produce a brightness adjusted digital image.

Referring to FIG. 8, the source digital image channels, three channels corresponding to red, green, and blue pixel information, are received by the luminance-chrominance module 110. This module produces three digital image channels; a pseudo luminance digital image channel and two chrominance digital image channels. The pseudo luminance digital image channel is received by the paxelization module 120 which produces a paxelized pseudo luminance digital image channel. The brightness transform module 130 receives the paxelized pseudo luminance digital image channel and the source digital image channels and produces brightness adjusted digital image channels. The brightness adjusted digital image channels constitute a brightness adjusted digital image which is also referred to as the processed digital image shown in FIGS. 2, 3, and 4.

Details of the Luminance-chrominance Module 110

The analysis phase of the tone brightness module depicted in FIG. 8 employs a luminance-chrominance module 110 to produce a pseudo luminance/chrominance, or LCC digital image, version of the source digital image consisting of a pseudo luminance digital image channel and two chrominance digital image channels denoted by GM and IL. The luminance-chrominance module 110 employs a 3×3 matrix transformation to convert the red, green, and blue pixel values into pseudo luminance and chrominance pixel values. Let $R_{ij}$, $G_{ij}$, and $B_{ij}$ refer to the pixel values corresponding to the red, green, and blue digital image channels located at the $i^{th}$ row and $j^{th}$ column. Let $L_{ij}$, $GM_{ij}$, and $IL_{ij}$ refer to the transformed pseudo luminance, first chrominance, and second chrominance pixel values respectively of the output LCC digital image. The 3×3 matrix transformation relating the input and output pixel values is as follows:

$$L_{ij} = 0.60\ R_{ij} + 0.40\ G_{ij} + 0.00\ B_{ij}$$

$$GM_{ij} = -0.25\ R_{ij} + 0.50\ G_{ij} - 0.25\ B_{ij}$$

$$IL_{ij} = -0.50\ R_{ij} + 0.50\ B_{ij}$$

An alternative embodiment of the present invention uses the following mathematical formulation:

$$L_{ij} = 0.50\ R_{ij} + 0.48\ G_{ij} + 0.02\ B_{ij}$$

$$GM_{ij} = -0.25\ R_{ij} + 0.50\ G_{ij} - 0.25\ B_{ij}$$

$$IL_{ij} = -0.50\ R_{ij} + 0.50\ B_{ij}$$

The advantage of using a pseudo luminance signal, characterized as having a reduced blue channel contribution and an enhanced red channel contribution is an increase in predictability for the purposes of scene brightness estimation. Experimentation with spatial filters operating on luminance or pseudo luminance signals constructed with different mixes of red, green and blue channel contributions to the pseudo luminance channel yielded better results when the contribution of the blue channel component was reduced to zero. The impact on scene brightness prediction performance is gradual as the blue channel component is reduced from 0.333 to 0.0. Other coefficients of the blue channel contribution also yield better brightness prediction performance such as coefficients in the 0.0 to 0.10 range.

The standard coefficient for the blue channel of many algorithms is set to 0.11 with the red coefficient set to 0.30 and the green coefficient set to 0.59.

This mix of red, green, and blue channel contributions to the luminance signal roughly matches the human visual response. Thus, setting the blue channel coefficient to less than 0.11 has not been used in practice. The present invention uses blue channel coefficients of less than 0.11 with improved brightness prediction performance results. Brightness prediction methods have been disclosed that utilize image signals that are not the luminance signal, for example a color difference signal. However, the use of a pseudo luminance signal for which the red, green, and blue coefficients are all greater than or equal to zero with a blue channel coefficient of less than 0.11 for the purposes of a brightness prediction method is unique to the present invention. Also unique to the present invention is the use of a pseudo luminance signal for which the red, green, and blue coefficients are all greater than or equal to zero with a blue channel coefficient of less than 0.11 and a red channel coefficient greater than or equal to the green channel coefficient.

The preferred embodiment of the present invention uses a red channel coefficient of 0.60, a green channel coefficient of 0.40 and blue channel coefficient of 0.0. These coefficients were derived by experimentation with a database of images and a range of different brightness prediction methods which use spatial filters. The details of optimization and that of different spatial filters are described in more detail below. Those skilled in the art will recognize that the present invention can be practiced with improved brightness prediction performance with other than the above mentioned coefficient values.

With a negligible blue channel contribution to the pseudo luminance digital image channel, the luminance digital image channel may be conceived as a yellow digital image channel since a yellow digital image channel is constructed of red and green components. However, with even small amounts of blue channel contribution, the pseudo luminance signal is considered distinct from the yellow signal.

The present invention uses the terms red, green, and blue with respect to the visible spectrum. Those skilled in the art will recognize that the signal corresponding to the red digital image channel of a digital image is mainly contributed from the longer wavelengths of the visible spectrum. By this description it is not intended to mean that no contribution of short and middle wavelengths of the visible spectrum may contribute to the signal corresponding to the red digital image channel. However, it is intended that the majority of visible spectrum contribution to the red digital image channel is from the longer visible wavelengths. Similarly, the blue digital image channel is mainly contributed from the short wavelengths of the visible spectrum and the green digital image channel is mainly contributed from the middle wavelengths of the visible spectrum.

It is also recognized by those skilled in the art that the present invention may be practiced by formulating a pseudo luminance signal with spectral filters prior to digitization of an image (for example a scanned photographic film image).

Details of the Paxelization Module 120

The preferred embodiment of the present invention of the brightness tone scale module 100 is shown in detail in FIG. 8. The three digital image channels (red, green, and blue) of a source digital image are input to a luminance-chrominance module 110 which produces an LCC digital image which includes a pseudo luminance digital image channel and two chrominance digital image channels denoted by GM and IL. The LCC digital image is received by the paxelization module 120 which produces a paxelized LCC digital image including a paxelized pseudo luminance digital image channel, a paxelized GM digital image channel and a paxelized IL digital image channel. The brightness scene balance module 130 receives the paxelized LCC digital image and the red, green, and blue digital image channels and produces brightness adjusted digital image.

Figure 9:
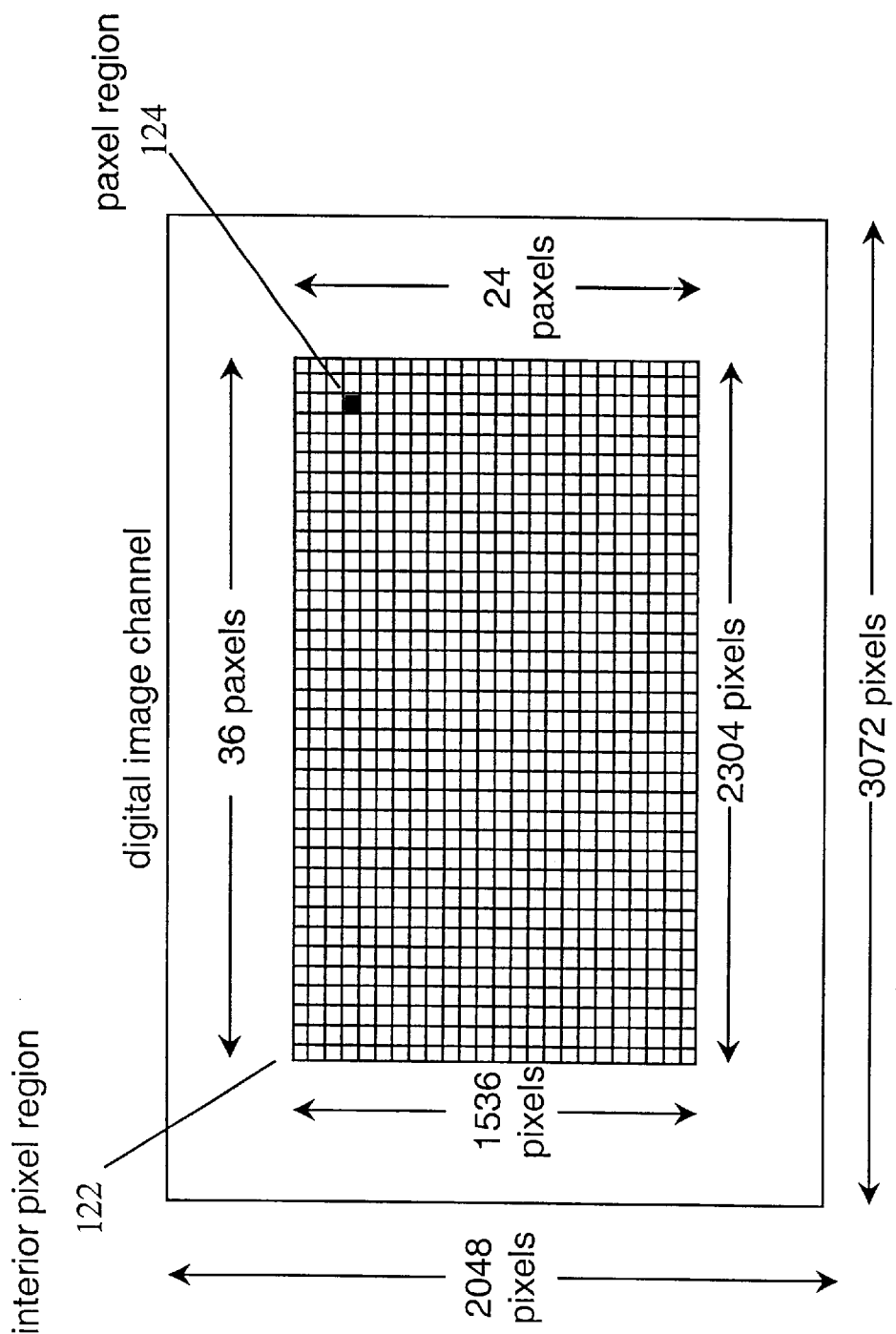
FIG. 9 is a pictorial diagram useful in describing the paxelization module according to the present invention.

Referring to FIG. 9, the pictorial diagram of the paxelization module 120 shows an example source digital image channel characterized by 2048 vertical pixels and 3072 horizontal pixels. Not all the pixels of the source digital image channel are used to generate the output paxelized digital image channel. The interior pixel region 122 is selected from the center 56.2 percent of the image area. This corresponds to a pixel region with dimensions of 75 percent that of the source digital image channel. For the example image shown, the interior pixel region 122 has 2304 pixels in the horizontal dimension and 1536 pixels in the vertical dimension. The output paxelized digital image channel contains 36 horizontal and 24 vertical pixels. Each pixel of the output paxelized digital image channel corresponds to a paxel region 124 in the source digital image channel.

Many methods of calculating a pixel value from the pixel values contained in a paxel region exist. Pixel averaging is the method used by the preferred embodiment of the present invention due to its efficient computational design. Let $p_{ij}$ represent the pixel values corresponding to a paxel region, and $q_{mn}$ the calculated pixel value located at the $mi^{th}$ row and $n^{th}$ column of the paxelized digital image channel. Then the value of $p_{ij}$ s given by $$q_{mn} = \frac{\sum_{ij} p_{ij}}{N}$$

where N represents the number of pixels contained in the paxel region. For the example illustrated in FIG. 9, the paxel region has 64×64 pixels making the value of N equal to 4096. The paxelization process may be achieved by a spatial filter convolution followed by a pixel sub-sampling process. The method used by the present invention is computationally more efficient.

Details of an Alternative Embodiment of the Brightness Tone Scale Module

Figure 10:
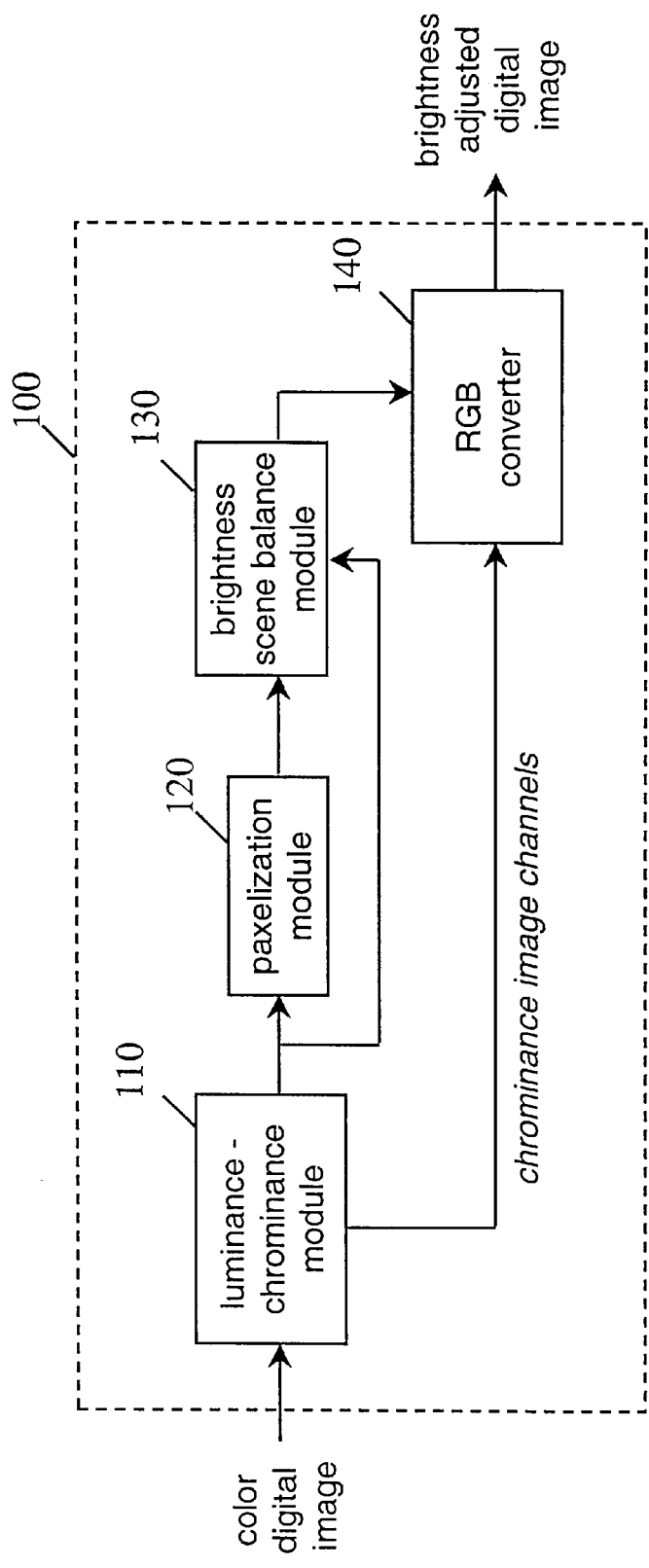
FIG. 10 is a block diagram showing the tone brightness module according to an alternative embodiment of the present invention.

An alternative embodiment of the present invention of the brightness tone scale module 100 is shown in detail in FIG. 10. The three digital image channels (red, green, and blue) of a source digital image are input to a luminance-chrominance module 110 which produces an LCC digital image which includes a pseudo luminance digital image channel and two chrominance digital image channels denoted by GM and IL. The LCC digital image is received by the paxelization module 120 which produces a paxelized LCC digital image including a paxelized pseudo luminance digital image channel, a paxelized GM digital image channel and a paxelized IL digital image channel. The brightness scene balance module 130 receives the paxelized LCC digital image and the pseudo luminance digital image channel and produces brightness adjusted pseudo luminance digital image channel. The GM and IL digital image channels and the brightness adjusted pseudo luminance digital image channel are input to an RGB converter 140 which generates a brightness adjusted digital image.

Details of the Brightness Transform Module 130

Figure 11:
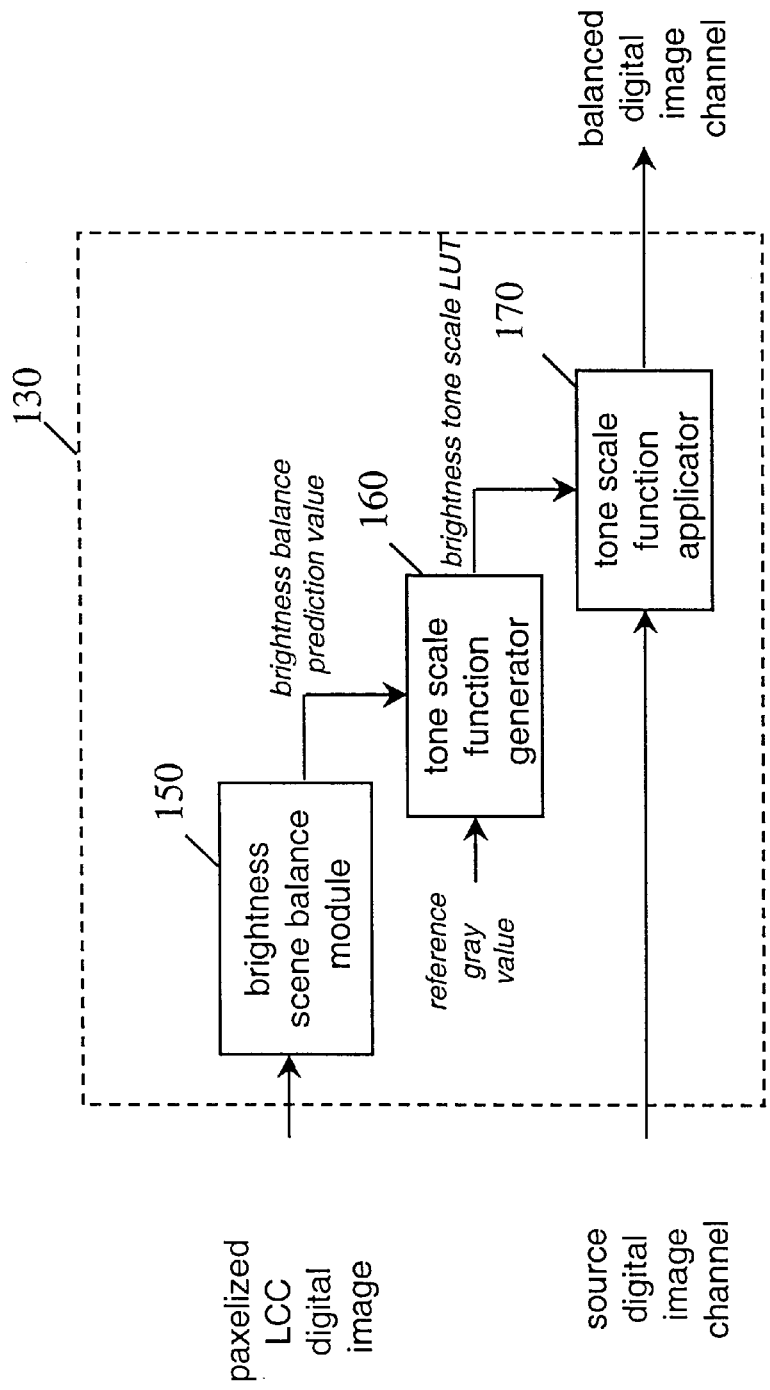
FIG. 11 is a block diagram showing the brightness transform module according to the present invention.

The brightness transform module 130 is shown in more detail in FIG. 11. The paxelized LCC digital image is received and analyzed by the brightness scene balance module 150 which produces a brightness balance value $\psi$, i.e. a numeric value corresponding to the preferred average brightness of the source digital image. The brightness balance value $\psi$ and a reference gray value $\rho$ are received by the tone scale function generator 160 which calculates a brightness tone scale function. The tone scale function applicator 170 receives one or more source digital image channels and the brightness tone scale function and applies the brightness tone scale function to the source digital image channel. The processed digital image channel is referred to as a balanced digital image channel. The preferred embodiment implementation of the tone scale function applicator 170 receives a red, green and blue digital image channel and produces a red, green and blue balanced digital image channel.

The reference gray value $\rho$ is a numerical constant which depends on the calibration procedure employed by the digital imaging system. It represents the pixel value corresponding to the preferred brightness of a digital image which needs no brightness adjustment. Thus digital images processed with the present invention which have a calculated brightness balance value y equal to the reference gray value $\rho$ will need no brightness adjustment. The best method of determining the reference gray value $\rho$ involves adjusting the output device controls such that a digital image produced with a properly exposed capture device produces a preferred or optimal rendition.

The numerical difference between the brightness balance value $\psi$ and the reference gray value $\rho$ represents the change in brightness or amount of brightness adjustment required. This quantity, termed the brightness shift value $\delta$, is given by the formula:

$$\beta = \rho - \psi.$$

The mathematical formula relating the source digital image channel pixel values $p_{ij}$ to the output balanced digital image pixel values $p'_{ij}$ is given by:

$$p'_{ij} = p_{ij} + \delta.$$

The brightness adjustment performed by the combination of the tone scale function generator 170 and the tone scale applicator 170 is an example of a single valued function transform, i.e. each input value has a single corresponding output value. This operation may be implemented as an addition or subtraction operation in computer hardware or software. However, for large digital images the same operation is more computationally efficient implemented as a LUT transformation. The brightness adjustment LUT may be calculated as $$LUT[k] = k + \delta$$

where assumes values that span the full range of pixel values. The tone scale applicator 170 applies the LUT to the pixel values of the digital image channel as $$p'_{ij} = LUT[p_{ij}]$$

where the [ ] notation refers to the LUT indexing operation, i.e. the output pixel value $p'_{ij}$ is given by the numerical value stored in the LUT at the index given by the input pixel value $p_{ij}$. The LUT produced by the tone scale function generator 160 constitutes an implementation of a tone scale function. Those skilled in the art will recognize that the present invention is not limited to just linear brightness tone scale functions but may used with more complicated tone scale functions which alter both the brightness and contrast characteristics of a digital image simultaneously, i.e. non-linear tone scale functions.

Details of the Brightness Scene Balance Module 150

Figure 12:
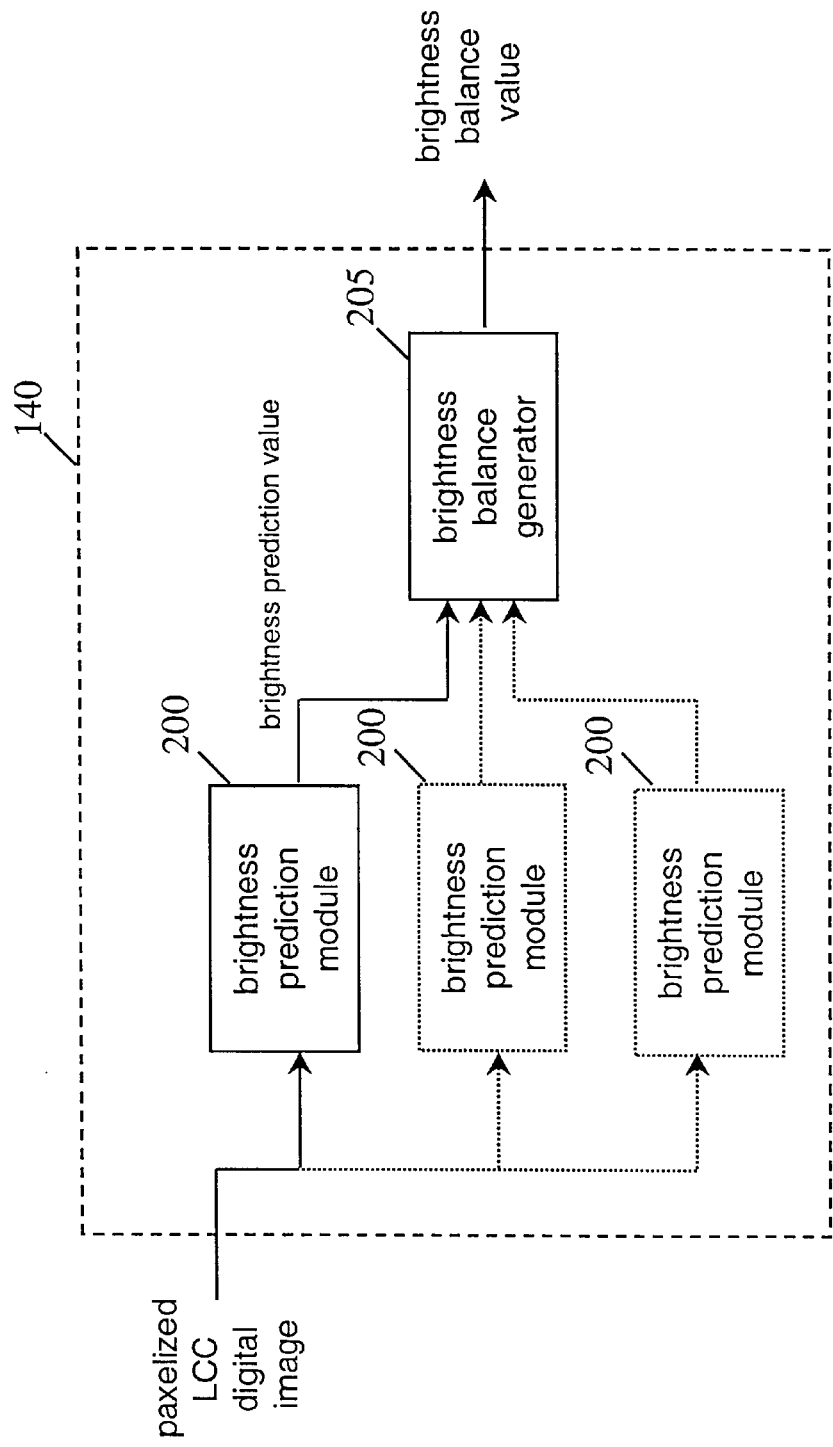
FIG. 12 is a block diagram showing the brightness scene balance module according to the present invention.

Referring to FIG. 12, the brightness scene balance module 150 includes one or more brightness prediction modules 200, each of which produce a brightness prediction value $\lambda$. The brightness prediction values from the individual brightness prediction modules 200 are numbered 1, 2, ..., M for M modules and the brightness prediction values produced are denoted as $\lambda^1, \lambda_2, \ldots, \lambda_M$. The brightness prediction values are combined by the brightness prediction generator 205 to produce a single output brightness balance value $\psi$ which is received by the tone scale function generator 160 shown in FIG. 11.

The diagram shown in FIG. 12 indicates three brightness prediction modules 200 to illustrate that the present invention may be used with other brightness prediction modules. Two of the brightness prediction modules 200 are illustrated with dotted lines indicating that the preferred embodiment of the present invention employs a single brightness prediction module 200. Example methods of other brightness prediction modules includes, but is not limited to, calculating the arithmetic mean, statistical median, maximum, minimum, or the average of the pixel maximum and pixel minimum. The brightness balance value My produced by the brightness prediction generator 205 is calculated with the mathematical relationship given as $$\psi = \alpha_0 + \lambda^1 - \lambda_{1o}$$

where $\lambda_1$ is the brightness prediction value calculated by the brightness prediction module 200, $\lambda_{1o}$ is a numerical constant termed a brightness prediction value offset, and $\alpha_0$ is a numerical constant termed a brightness balance value offset.

The brightness prediction value offset $\lambda_{1o}$ is a numerical constant which represents the difference between the reference gray value $\rho$ and the expected value of $\lambda_1$ produced by the brightness prediction module 200. The best method for determining the value of $\lambda_{1o}$ involves a calibration procedure of capturing a data base of digital images, processing the data base of digital images and making hard copy print renditions of the calculated digital images, having a set of human image quality judges optimize the print renditions of the digital images, and setting the value of $\lambda_{1o}$ based on the difference between the optimized print renditions and the calculated print renditions.

Referring to FIG. 2, a set of test digital images is produced with a capture device 10, processed with a digital image processor 20 employing the present invention, and hard copy prints are generated for each test image with an image output device 30. For a test set of N test images, the values of $\lambda_{1o}$ and $\alpha_0$ are temporarily set to zero. Each digital image is processed with the digital image processor 20 and a set of brightness balance values $\psi^1, \ldots, \Psi_N$ is generated. These calculated values of $\psi$ are termed the set of algorithm balance values denoted by $B^1, ,B^N$. A set of human image quality judges views the hard copy prints and makes judgments as to the brightness of each test image print. Each digital image is reprinted with the value of $\alpha_0$ modified by each judge until the best overall brightness for each test image is obtained. The values of the brightness balance values $\psi$ for each test image are recorded for each image quality judge and the $\psi$ values across the set of image quality judges is averaged for each test image. For the set of N test images a set of N average brightness balance values $\psi^1, \ldots, \Psi_N$ is generated. These optimized values of $\psi$ are termed the set of aim balance values denoted by $A_1, ,A_N$. The value of brightness prediction value offset $\lambda_{1o}$ is calculated by taking the difference between the aim balance values and the algorithm balance values by the formula $$\lambda_{1o} = \frac{\sum_k A_k - B_k}{N}$$

With the value of $\lambda_{1o}$ set as per the above equation and the brightness balance value offset $\alpha_0$ set at zero, the system will be calibrated to the brightness preference of the average image quality judge. The actual value of $\lambda_{1o}$ depends on the value of the reference gray value p and the preference of the set of human image quality judges.

The brightness balance value offset $\alpha_0$ represents a brightness preference which can be tuned for different imaging applications or for personal preference. With the calibration method described above for the brightness prediction value offset $\lambda_{1o}$, the value of brightness balance value offset $\alpha_0$ is set to zero. However, if the operator of a digital imaging system as shown in FIG. 2 employing the present invention has an image quality brightness preference which differs from that of the image quality judges used to determine the value of the brightness prediction value offset $\lambda_{1o}$, the operator may choose to change the value of the brightness balance value offset $\alpha_0$. While viewing a rendered digital image on the monitor device 50 or by viewing a hard copy print produced with an image output device 30, the operator may indicate a change in the value of $\alpha_0$ via an input control device 60. The changes to the brightness balance value offset $\alpha_0$ may be performed uniquely for each individual digital image processed by the system or set once for all digital images.

Referring to FIG. 12, an alternative embodiment of the present invention may use multiple brightness prediction modules 200. The following mathematical equation employed by the present invention by the brightness prediction generator 205 to calculate the value of the brightness balance value $\psi$ from the multiple brightness prediction values $\lambda_i$ is given by $$\psi = \alpha_0 + \Sigma_i \alpha_i (\lambda_i - \lambda_{io})$$

where $\lambda_i$ represents the brightness prediction value of the $i^{th}$ brightness prediction module 200, $\lambda_{io}$ represents the corresponding brightness prediction value offset, $\alpha_i$ represents a brightness prediction coefficient corresponding the $i^{th}$ brightness prediction value $\lambda_i$ and $\alpha_0$ represents the brightness balance value offset. For this alternative embodiment of the present invention, the values of the brightness prediction value offsets $\lambda_{io}$ are determined by the same calibration method used by the preferred embodiment of the present invention. Each brightness prediction value offset is determined with the corresponding brightness prediction coefficient set to one and the other brightness prediction coefficients set to zero.

The values of the brightness prediction coefficients $\alpha_i$ are determined by linear regression. For the set of N test images a set of brightness prediction values $\lambda_i$ are generated denoted by $\lambda_{1i}, \ldots, \lambda_{Ni}$. Represented as a two dimensional array of values, the set of brightness prediction values $\lambda_{1i}, \ldots, \lambda_{Ni}$ forms a N by M brightness prediction matrix $[\lambda]$. The set of aim balance values $A_1, ,A_N$ forms an N by 1 matrix $[A]$. For a set of M brightness prediction modules 200, the corresponding M brightness prediction coefficients $\alpha_1, \ldots, \alpha_M$ form an M by 1 matrix $[\alpha]$. Thus the matrix equation relating the aim balance values, brightness prediction values, and the brightness prediction coefficients s given by $$[A] = [\lambda][\alpha].$$

where the matrices $[A]$ and $[\lambda]$ are known and the matrix $[\alpha]$ is unknown. The value of the matrix $[\alpha]$ may be solved by the following mathematical formula $$[\alpha] = [[\lambda]^t[\lambda]]^{-1}[\lambda]^t[A]$$

were the $[\lambda]$ matrix elements are given by $$\lambda_{11}\lambda_{12} \ldots \lambda_{1M}$$
$$\lambda_{11}\lambda_{12} \ldots \lambda_{1M}$$
$$\ldots$$
$$\lambda_{N1}\lambda_{N2} \ldots \lambda_{NM}$$

where the element $\lambda_{ki}$ represents the of brightness prediction value for the $k^{th}$ test image and the $i^{th}$ brightness prediction module 200 and the $[]^t$ notation denotes the matrix transpose operation and the $[]^{-1}$ notation denotes the matrix inverse operation. The values of the brightness prediction coefficients $\alpha_1, \ldots, \alpha_M$ are given by the elements of the $[\alpha]$ matrix. The brightness balance value offset $\alpha_0$ is not affected by the linear regression. The value of the brightness balance value offset $\alpha_0$ may be selected by the system operator.

A second alternative embodiment of the present invention uses the following mathematical formula for calculating the brightness balance value $\psi$ by the brightness prediction generator 205

$$\psi = \alpha_0 + \Sigma_i \alpha_i \lambda_i$$

were the $[\lambda]$ matrix elements are given by $$1\lambda_{11}\lambda_{12} \ldots \lambda_{1M}$$
$$1\lambda_{11}\lambda_{12} \ldots \lambda_{1M}$$
$$1\lambda_{N1}\lambda_{N2} \ldots \lambda_{NM}$$

where the element $\lambda_{ki}$ represents the of brightness prediction value for the $k^{th}$ test image and the $i^{th}$ brightness prediction module 200., $\alpha_i$ represents a brightness prediction coefficient corresponding the $i^{th}$ brightness prediction value $\lambda_i$ and $\alpha_0$ represents the brightness balance value offset.

The values of the brightness prediction coefficients $\alpha_i$ are determined by the linear regression equation given by $$[A] = [\lambda][\alpha].$$

where the matrices $[A]$ and $[\lambda]$ are known and the matrix $[\alpha]$ is unknown. The value of the matrix $[\alpha]$ may be solved by the following mathematical formula $$[\alpha] = [[\lambda]^t[\lambda]]^{-1}[\lambda]^t[A]$$

where the $[]^t$ notation denotes the matrix transpose operation and the $[]^{-1}$ notation denotes the matrix inverse operation.

The values of the brightness prediction coefficients $\alpha_1, \ldots, \alpha_M$ are given by the elements of the [$\alpha$] matrix. The brightness balance value offset ($\alpha_0$ is set by the linear regression. The value of the brightness balance value offset $\alpha_0$ may be selected by the system operator.

Details of the Brightness Prediction Module 200

A spatial weighting mask is a two dimensional array of numerical weighting factors. The numerical weighting factors of a spatial weighting mask relate to the relative importance of pixel location. Spatial weighting masks are used in conjunction with a digital image channel to weight the relative importance of the pixels values of the digital image channel.

Figure 13:
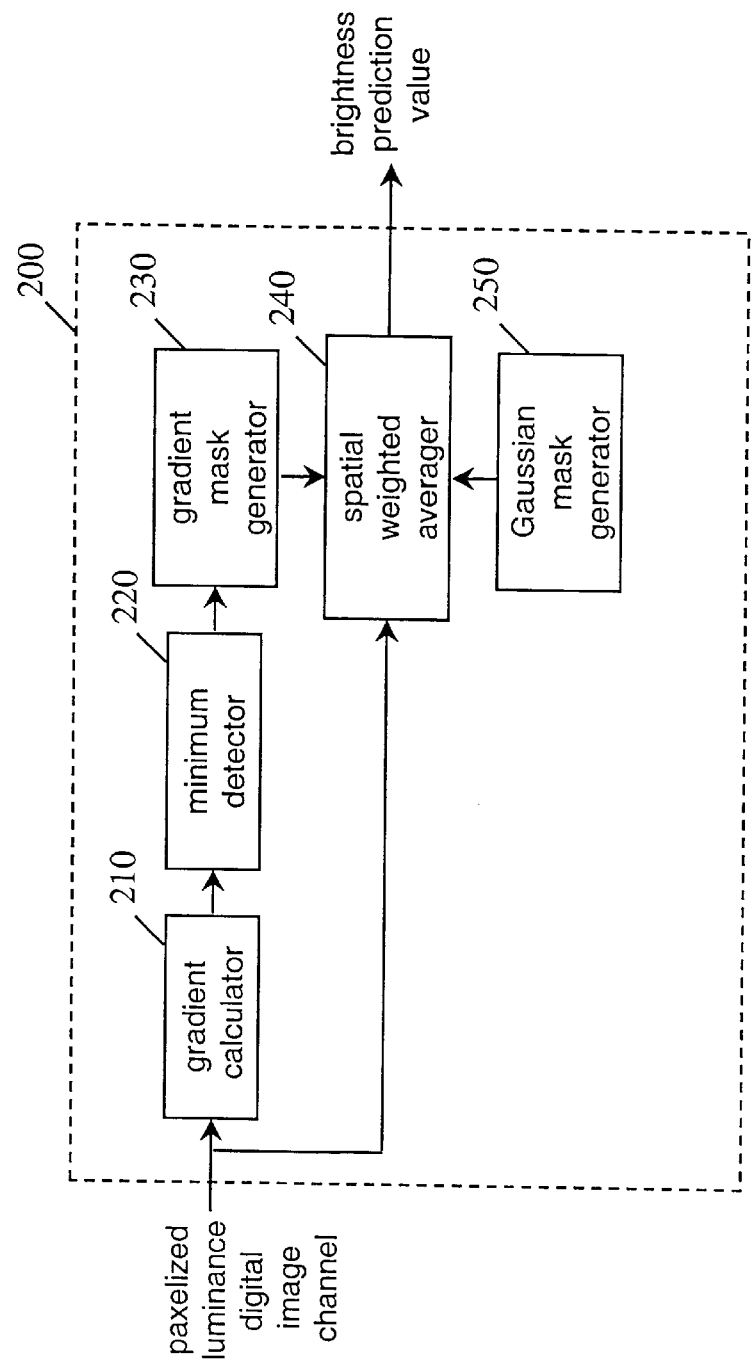
FIG. 13 is a block diagram showing the brightness prediction module according to the present invention.

Referring to FIG. 13, the Gaussian mask generator 250 produces a Gaussian spatial weighting mask with the same spatial dimensions as the paxelized pseudo luminance digital image channel. According to the present invention, the weighting factors can have more than two possible values. In the preferred embodiment of the invention, the weighting factors of the Gaussian weighting mask range from 0.0 to 1.0 with continuous numerical values calculated with a two dimensional Gaussian formula as follows:

$$\xi_{ij} = K + (1-K)e^{-((i-i_o)^2/2\sigma_i 2 + (j-j_o)^2/2\sigma_j 2)}$$

where $\xi_{ij}$ represents the Gaussian weighting factor value located at the $i^{th}$ row and $j^{th}$ column, $i_o$ and $j_o$ represent the vertical and horizontal indices of the Gaussian function center, $\sigma_o$ and $\sigma_j$ represent the vertical and horizontal Gaussian standard deviation values, and K is numerical constant which regulates the relative importance of the center pixel locations to perimeter pixel locations.

The placement of the Gausssian function center depends on the orientation of the corresponding digital image being processed. If the orientation is unknown, the numerical constants $i_o$ is set to one half the vertical dimension of the Gaussian spatial weighting mask. Similarly, the numerical constants $j_o$ is set to one half the horizontal dimension of the Gaussian spatial weighting mask. Thus for the example digital image shown in FIG. 9, the numerical constant $i_o$ is set to 17.5 assuming the pixel index ranges from 0 to 35. Similarly, the numerical constant $j_o$ is set to 11.5 assuming the pixel index ranges from 0 to 23. For reference, a pixel index of 0 horizontal and 0 vertical represents the top of the Gaussian spatial weighting mask corresponding to the upper left hand corner of the paxelized pseudo luminance digital image shown in FIG. 9. If the orientation of the digital image is known, the center of the Gaussian function is positioned 60 percent toward the bottom of the Gaussian spatial weighting mask. For the example given above, the value of $i_0$ would be set to 17.5 and the value of $j_o$ would be set to 13.8.

The preferred embodiment of the present invention uses a value of 0.25 for the parameter K. This achieves approximately a three to one weighting ratio for the center pixels versus the perimeter pixels. Experimentation with many digital images has shown this value to work well. The value of $\sigma_i$ and $\sigma_j$ have also been empirically set through experimentation with large numbers of digital images. Although the present invention works well with a range of values for $\sigma_i$ and $\sigma_j$, the best results have been achieved with $\sigma_i$ and $\sigma_j$ set to 25 percent of the respective Gaussian spatial weighting mask dimension. For the example dimensions of 24 rows and 36 columns, the value of $\sigma_i$ is set to 6.0 and the value of $\sigma_j$ is set to 9.0.

FIG. 13 shows the details of the brightness prediction module 200 employed by the preferred embodiment of the present invention. The gradient calculator 210 receives the paxelized pseudo luminance digital image channel of the paxelized LCC digital image. For each pixel of interest in the paxelized pseudo luminance digital image channel, a set of gradient pixel values, given by $$g_1, g_2, \ldots, g_n$$

is calculated using the values of pixels located in a small local neighborhood of pixels about the pixel of interest. The preferred embodiment of the present invention uses a 3 by 3 local neighborhood of pixels. For the purposes of the present invention, a gradient pixel value will be defined mathematically as the absolute value of the difference between two pixels. The present invention uses pixel data characterized by a logarithmic code value domain property. If the present invention is implemented with pixel data characterized by a linear code value domain property, the definition of a gradient pixel value will be given by the ratio of two pixel values.

The gradient pixel value calculation is a measure of spatial activity in that the calculation relates to the pixel modulation, or pixel value variability within a small local region of pixels about a pixel of interest. Examples of other spatial activity measures include but are not limited to the standard deviation and mean deviation calculated for pixels in a neighborhood about a pixel of interest.

The present invention employs more than one method of calculating spatial actively. For reference, the following method is described by described by P. A. Dondes and A. Rosenfeld in the journal article Pixel classification based on gray level and local busyness, *IEEE Transactions on Pattern Analysis and Machine Intelligence*, Vol. PAMI-4, No:1, pp 79–84, 1982. The set of gradient pixel values is generated by calculating the absolute value of the pixel differences between the value of pixel of interest and the individual pixels in the local neighborhood of pixels. For a 3 by 3 pixel region centered about a pixel of interest e,

| a | b | c |
|---|---|---|
| d | e | f |
| g | h | i |

8 gradient pixel values are calculated since there are 8 pixels in a 3 by 3 pixel region excluding the pixel of interest. Thus the mathematical formula for the individual gradient pixel values is given by $$g_1 = |a-e| \quad g_2 = |b-e| \quad g_3 = |c-e| \quad g_4 = |d-e|$$

$$g_5 = |f-e| \quad g_6 = |g-e| \quad g_7 = |h-e| \quad g_8 = |i-e|$$

where e represents the value of the pixel $p_{ij}$ located at the $i^{th}$ row and $j^{th}$ column. For a 5 by 5 neighborhood of pixels 24 gradient pixel values would be calculated. Since the calculation of the set of gradient pixel values requires two pixels to form a difference, the pixels of interest lying on the perimeter of the paxelized pseudo luminance digital image channel will generate fewer numbers of gradient pixel values in the set of gradient pixel values.

An alternative embodiment of the present invention forms the set of gradient pixel values by calculating the horizontal and vertical pixel differences of adjacent pixels within the pre-defined local neighborhood of pixels. For a 3 by 3 local neighborhood of pixels 6 horizontal and 6 vertical gradient pixel values are calculated for a total of 12 gradient pixel values. Thus the mathematical formulas for the individual vertical gradient pixel values are given by $g_1=|a-d|$ $g_2=|d-g|$ $g_3=|b-e|$ $g_4=|e-h|$ $g_5=|c-f|$ $g_6=|f-i|$ and the horizontal gradient pixel values are given by $g_7=|a-b|$ $g_8=|b-c|$ $g_9=|d-e|$ $g_{10}=|e-f|$ $g_{11}=|g-h|$ $g_{12}=|h-i|$ The set of gradient pixel values is received by the minimum detector 220 which sorts the set of gradient pixel values in rank order, i.e. either in ascending or descending order. Once the set of gradient pixel values is sorted a rank order statistic is obtained from the set, e.g. the minimum, maximum, or median. The preferred embodiment of the present invention uses the minimum rank order statistic. The rank order statistical quantity will be termed the rank order gradient pixel value $G_{ro}$ denoted by $G_{ro}=MIN(g_1, g_2, \ldots, g_n).$ The minimum and maximum rank order statistics are special cases which may be obtained without actually having to sort the set of gradient pixel values.

An alternative embodiment of the present invention forms two gradient pixel values by calculating the sums of the horizontal and the sums vertical pixel differences of adjacent pixels within the pre-defined local neighborhood of pixels. For a 3 by 3 local neighborhood of pixels a horizontal and a vertical gradient pixel values are calculated. The mathematical formulas for the two gradient pixel values are given by $g_1=|a-d|+|d-g|+|b-e|+|e-h|+|c-f|+|f-i|$ and $g_2=|a-b|+|b-c|+|d-e|+|e-f|+|g-h|+|h-i|$ The calculated rank order gradient pixel value $G_{ro}$ for this alternative embodiment is given by:

$G_{ro}=MIN(g_1, g_2).$

An alternative embodiment of the present involves calculating the rank order gradient pixel value $G_{ro}$ by calculating the minimum and maximum pixel value within local neighborhood of pixels about a pixel of interest. For a 3 by 3 pixel region centered about a pixel of interest e, a b c d e f g h i the rank order gradient pixel value $G_{ro}$ is given by $G_{ro}=\max(a, b, c, d, e, f, g, h, i)-\min(a, b, c, d, e, f, g, h, i).$ The rank order gradient pixel value $G_{ro}$ represents a measure of the spatial activity for a local region about the pixel of interest. The rank order gradient pixel value $G_{ro}$ is used by the gradient mask generator 230 to produce a weighting factor $\phi$ which is formulated as a function of the rank order gradient pixel value $G_{ro}$ given by $\phi=\gamma(G_{ro})$ where the $\gamma( )$ is given by the gamma function as the integration of a Gaussian. The function $\gamma( )$ is single valued function transform given by the equation:

$$\gamma(x) = \frac{y_o + \sum e^{-(x-x_t)^2/2\sigma_x^2}}{y_o + \sum e^{-(x_{max}-x_t)^2/2\sigma_x^2}}$$

where $y_o$ represents a minimum weighting factor, $x_{max}$ represents a maximum abscissa value of the variable x, $x_t$ represents a transition parameter and where $\sigma_x$ represents a transition rate parameter. According to the present invention, the weighting factors can assume more than 2 values.

Figure 14:
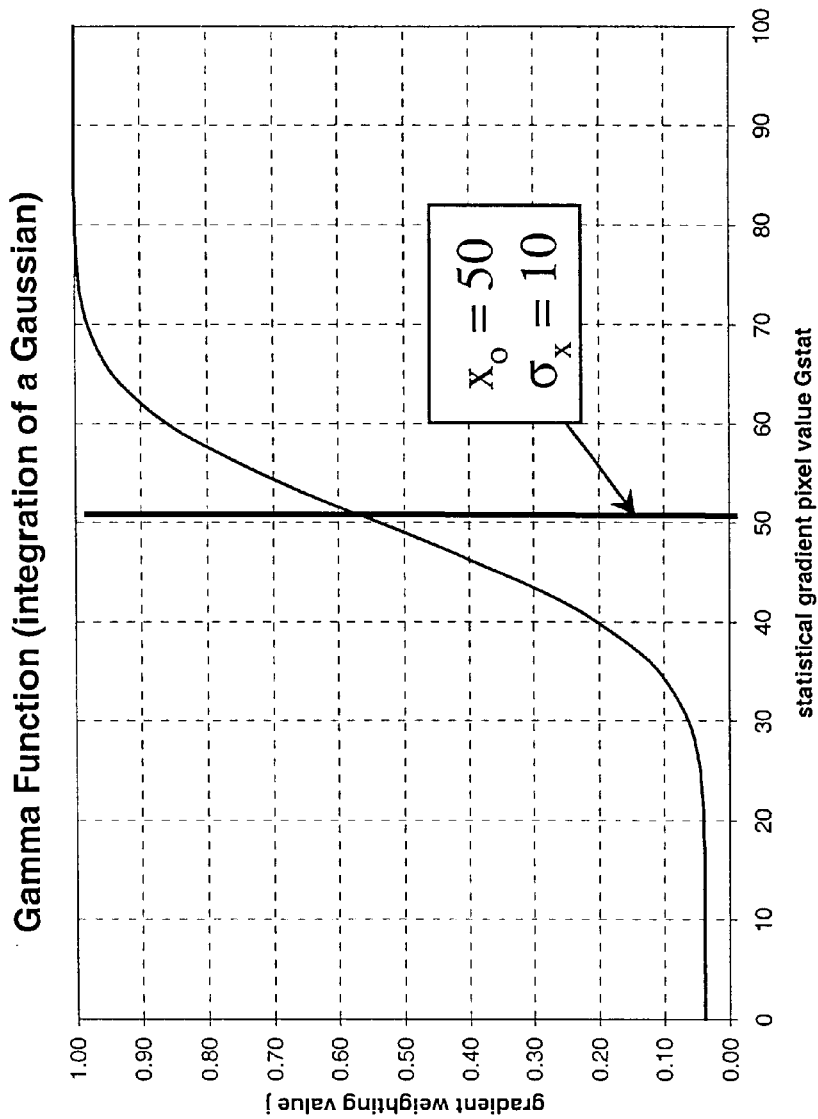
FIG. 14 is an example graph of a gamma function used to calculate weighting factors according to the present invention.

An example of the gamma function g(x) is shown in FIG. 14 calculated with $y_o$ set to 1, $x_t$ set to 50, $x_{max}$ set to 100, and $\sigma_x$ set to 10. As can be seen from the graph of the gamma function shown in FIG. 14, the transition parameter $x_t$ determines the inflection point, or point of maximum slope of the gamma function. The transition rate parameter $\sigma_x$ determines the slope of the gamma function at the inflection point.

The weighting factor $\phi$ is calculated for each pixel in the paxelized pseudo luminance digital image channel. Thus $\phi_{ij}$ represents a weighting factor calculated for the pixel located at the $i^{th}$ row and $j^{th}$ column. This two dimensional array of weighting factors, forms a spatial weighting mask. The weighting mask produced by the gradient mask generator 230 will be referred to as the gradient spatial weighting mask. The preferred embodiment of the present invention uses a gradient spatial weighting mask populated with weighting factors $\phi$ constrained to the values greater than or equal to 0 and less than or equal to 1. Those skilled in the art will recognize that the present invention will work with weighting factors $\phi$ ranging beyond 1. In particular, a fast implementation of the weighting factors $\phi$ involves using integer values ranging from 0 to 4095.

An alternative embodiment of the present invention uses the statistical gradient pixel value described in the preferred embodiment as the weighting factor $\phi$ directly. For this implementation the mathematical formulation is given by $\phi=C_{ro}.$ Weighted Average Calculator 240

The spatial weighted averager 240, shown in FIG. 13 receives the gradient spatial weighting mask from the gradient mask generator 230, the Gaussian spatial weighting mask from the Gaussian mask generator 250, and the paxelized pseudo luminance digital image channel from the paxelization module 120. A brightness prediction value $\lambda$ is produced by the spatial weighted averager 240 through a numerical integration equation as follows:

$$\lambda = \frac{\sum_{ij} p_{ij}\varphi_{ij}\xi_{ij}}{\sum_{ij} \varphi_{ij}\xi_{ij}}$$

where i and j represent the row and column pixel indices, $p_{ij}$ represents the value of the pseudo luminance digital image channel pixel, $\phi_{ij}$ represents the value of the gradient weighting factor, and $\xi_{ij}$ represents the value of the Gaussian spatial weighting factor. The brightness prediction value $\lambda$ represents a spatially weighted average of pixel values which forms a good estimate of the average brightness of the digital image.

The optimal value for the gradient threshold value y used by the gradient mask generator 230 shown in FIG. 13 is determined by minimizing the standard deviation of printing errors of an implementation of the digital image processor 20 shown in FIG. 2. For the set of N test images, a set of brightness prediction values $\lambda_j$ are generated denoted by $\lambda_1, \ldots, \lambda_N$ one $\lambda$ value for each test image. The set of aim balance values $A_1, ,A_N$ used in the calibration process is recalled. A set of balance error values $\epsilon_1, ,\epsilon_N$ is generated by subtracting the aim balance values from the brightness prediction values as $$\epsilon_j = \lambda_j - A_j$$

where the index j denotes the $j^{th}$ test image. The gradient threshold value $\epsilon$ is varied until a minimum statistical standard deviation of the balance error values $\epsilon_1, ,\epsilon_N$ is found.

The invention has been described in detail with particular reference to certain preferred embodiments thereof, but it will be understood that variations and modifications can be effected within the spirit and scope of the invention.

PARTS LIST

| | |
|---|---|
| 10 | image capture device |
| 11 | aperture device |
| 12 | lens |
| 13 | time integration device |
| 14 | photosensitive recording device |
| 15 | photosensitive monitoring device |
| 16 | exposure control device |
| 20 | digital image processor |
| 22 | enhancement transform module |
| 24 | color transform module |
| 26 | logarithm transform module |
| 30 | image output device |
| 31 | photographic image |
| 32 | film scanner |
| 34 | lamp house |
| 36 | gate device |
| 38 | photographic receiver |
| 40 | general control computer |
| 45 | computer network |
| 50 | monitor device |
| 60 | input control device |
| 70 | computer memory device |
| 100 | brightness tone scale module |
| 110 | luminance-chrominance module |
| 111 | red digital image channel |
| 112 | green digital image channel |
| 113 | blue digital image channel |
| 115 | pseudo luminance signal generator |
| 116 | chrominance signal generator |
| 118 | red-green digital image channel |
| 119 | chrominance digital image channels |
| 120 | paxelization module |
| 122 | interior pixel region |
| 124 | paxel region |
| 130 | brightness transform module |
| 140 | RGB converter |
| 150 | brightness scene balance module |
| 160 | tone scale function generator |
| 170 | tone scale function applicator |
| 200 | brightness prediction module |
| 205 | brightness prediction generator |
| 210 | gradient calculator |
| 220 | minimum detector |
| 230 | gradient mask generator |
| 240 | spatial weighted averager |
| 250 | Gaussian mask generator |

What is claimed is:

1. A method of calculating a brightness balance value for an original image having contribution from the visible spectrum of wavelengths including red, green, and blue wavelengths comprising the steps of:
   a) generating one or more pseudo luminance values from the original image wherein
      (i) the pseudo luminance value contribution from the red wavelengths is greater than or equal to the contribution from the green wavelengths;
      (ii) the pseudo luminance value contribution from the green wavelengths is greater than the contribution from the blue wavelengths;
      (iii) the pseudo luminance value contribution from the red and green wavelengths are greater than zero; and
      (iv) the pseudo luminance value contribution from the blue wavelengths is greater than or equal to zero; and
   b) using the pseudo luminance values to calculate a brightness balance value.

2. The method claimed in claim 1, used in an exposure control device, wherein the brightness balance value is derived from pseudo luminance value(s) that are produced as the output of a photosensitive device in the exposure control device by employing a yellow-orange filter over the a photosensitive device, and the brightness balance value is used by the exposure control device to adjust the exposure of a photosensitive medium to produce a final image.

3. The method claimed in claim 2, wherein the a photosensitive device is a single photocell.

4. The method claimed in claim 2, wherein the a photosensitive device is an array of photocells.

5. The method claimed in claim 2, wherein the exposure control device is in a camera.

6. The method claimed in claim 2, wherein the exposure control device is in a photographic printer.

7. The method claimed in claim 1, wherein the brightness balance value is obtained by forming a digital image of the original image and processing the digital image to derive the brightness balance value.

8. The method claimed in claim 7, wherein the processing the digital image comprises the steps of:
   a) producing a pseudo luminance values for two or more pixels in the digital image to produce a pseudo luminance digital image channel; and
   b) applying a spatial filter to the pseudo luminance digital image channel to produce the brightness balance value.

9. The method claimed in claim 8, used in an exposure control device, wherein the brightness balance value is used by an exposure control device to adjust the exposure of a photosensitive medium to produce a final image.

10. The method claimed in claim 8, wherein the brightness balance value is used to adjust the balance of the digital image.

11. The method claimed in claim 8, wherein the spatial filter comprises the steps of:
   a) identifying a pixel of interest and a local neighborhood of pixels about the pixel of interest;
   b) generating a weighting factor for each of the local neighborhoods of pixels as a function of the spatial activity of the local neighborhoods of pixels, the weighting factors having more than one possible value; and
   c) applying the weighting factors to the pixels of the pseudo luminance digital image channel to produce the brightness balance value.

12. The method of claim 11, wherein the spatial activity measure is a function of one or more gradient pixel values calculated as the difference between two or more pixels in a local neighborhood.

13. The method claimed in claim 12, wherein the spatial activity measure is calculated by first calculating a set of gradient pixel values in a local neighborhood, and selecting one of the gradient pixel values from the set based on a predetermined criterion.

14. The method claimed in claim 13, wherein the gradient pixel values are calculated by taking the absolute value of the difference between a center pixel in the local neighborhood and neighboring pixels and selecting the minimum gradient pixel value.

15. The method claimed in claim 12, wherein the spatial activity measure is calculated by generating a horizontal gradient pixel value formed as the sum of absolute values of differences between pixels in a horizontal direction, and a vertical gradient pixel value formed as the sum of absolute values of differences between pixels in a vertical direction, and selecting the lower of the horizontal and vertical gradient pixel values.

16. The method claimed in claim 12, wherein the spatial activity measure is calculated by generating a set of horizontal and vertical gradient pixel values formed as the absolute values of differences between pixels in a vertical and a horizontal direction and selecting the median value in the set.

17. The method claimed in claim 12, wherein the gradient pixel value is calculated as the absolute value of the difference between the maximum and minimum pixel values in the local neighborhood.

18. The method claimed in claim 11, wherein the weighting factor is a further function of the location of the local neighborhood within the pseudo luminance digital image channel.

19. The method claimed in claim 18, wherein the further function is a Gaussian weighting function.

20. The method claimed in claim 11, wherein the function of spatial activity is a gamma function obtained by integrating a Gaussian function.

21. The method claimed in claim 8, further comprising the step of first producing a lower resolution version of the pseudo luminance digital image channel, processing the lower resolution pseudo luminance digital image channel to produce the brightness balance value.

22. The method claimed in claim 10, wherein the balance of the digital image is adjusted by employing a LUT that is generated based on the brightness balance value.

23. The method claimed in claim 8, further comprising the step of attaching the brightness balance value to the digital image as meta data.

24. A method of producing a final image, comprising the steps of:
a) generating one or more pseudo luminance values from an original image according to the relationship, $L=\alpha R+\beta G+\delta B$, where R, G, B represent red, green and blue components of the original image, and $\alpha \geq \beta > \delta \geq 0$;
b) using the pseudo luminance values (L) to calculate a brightness balance value; and
c) using the brightness balance value and the original image to produce the final image.

25. A computer program product for implementing the method of claim 1.

26. A computer program product for implementing the method of claim 2.

27. A computer program product for implementing the method of claim 3.

28. A computer program product for implementing the method of claim 4.

29. A computer program product for implementing the method of claim 5.

30. A computer program product for implementing the method of claim 6.

31. A computer program product for implementing the method of claim 7.

32. A computer program product for implementing the method of claim 8.

33. A computer program product for implementing the method of claim 9.

34. A computer program product for implementing the method of claim 10.

35. A computer program product for implementing the method of claim 11.

36. A computer program product for implementing the method of claim 12.

37. A computer program product for implementing the method of claim 13.

38. A computer program product for implementing the method of claim 14.

39. A computer program product for implementing the method of claim 15.

40. A computer program product for implementing the method of claim 16.

41. A computer program product for implementing the method of claim 17.

42. A computer program product for implementing the method of claim 18.

43. A computer program product for implementing the method of claim 19.

44. A computer program product for implementing the method of claim 20.

45. A computer program product for implementing the method of claim 21.

46. A computer program product for implementing the method of claim 22.

47. A computer program product for implementing the method of claim 23.

48. A computer program product for implementing the method of claim 24.

49. An apparatus for calculating a brightness balance value for an original image having contribution from the visible spectrum of wavelengths including red, green, and blue wavelengths comprising:
a) means for generating one or more pseudo luminance values from the original image wherein
(i) the pseudo luminance value contribution from the red wavelengths is greater than or equal to the contribution from the green wavelengths;
(ii) the pseudo luminance value contribution from the green wavelengths is greater than the contribution from the blue wavelengths;
(iii) the pseudo luminance value contribution from the red and green wavelengths are greater than zero; and
(iv) the pseudo luminance value contribution from the blue wavelengths is greater than or equal to zero; and
b) means for using the pseudo luminance values to calculate a brightness balance value.

50. The apparatus claimed in claim 49, used in an exposure control device, wherein the means of the brightness balance value is derived from pseudo luminance value(s) that are produced as the output of a photodetector in the exposure control device by employing a yellow-orange filter over the a photosensitive device, and the brightness balance value is used by the exposure control device to adjust the exposure of a photosensitive medium to produce the final image.

51. The apparatus claimed in claim 49, wherein the means of the photosensitive device is a single photocell.

52. The apparatus claimed in claim 49, wherein the means of the photosensitive device is an array of photocells.

53. The apparatus claimed in claim 49, wherein the means of the exposure control device is in a camera.

54. The apparatus claimed in claim 49, wherein the means of the exposure control device is in a photographic printer.

55. The apparatus claimed in claim 50, wherein the means of the brightness balance value is obtained by forming a digital image of the original image and processing the digital image to derive the brightness balance value.

56. The apparatus claimed in claim 50, wherein the means of the processing comprises the means of:
   a) producing a pseudo luminance values for each pixel in the image to produce a pseudo luminance digital image channel; and
   b) applying a spatial filter to the pseudo luminance digital image channel to produce the brightness balance value.

57. The apparatus claimed in claim 50, wherein the means of the brightness balance value is used to control the exposure in a camera or photographic printer to produce the final image.

58. The apparatus claimed in claim 50, wherein the means of the brightness balance value is used to modify the brightness of the original image to produce the final image.

59. The apparatus claimed in claim 50, wherein the means of the spatial filter comprises the means of:
   a) identifying a pixel of interest and a local neighborhood of pixels about the pixel of interest;
   b) generating a weighting factor for each of the local neighborhoods of pixels as a function of the spatial activity of the local neighborhoods of pixels, the weighting factors having more than one possible value; and
   c) applying the weighting factors to the pixels of the pseudo luminance digital image channel to produce the brightness balance value.

60. The apparatus claimed in claim 59, wherein the means of the spatial activity measure is a function of one or more gradient pixel values calculated as the difference between two or more pixels in a local neighborhood.

61. The apparatus claimed in claim 59, wherein the means of the spatial activity measure is calculated by first calculating a set of gradient pixel values in a local neighborhood, and selecting one of the gradient pixel values from the set based on a predetermined criterion.

62. The apparatus claimed in claim 59, wherein the means of the gradient pixel values are calculated by taking the absolute value of the difference between a center pixel in the local neighborhood and neighboring pixels and selecting the minimum gradient pixel value.

63. The apparatus claimed in claim 59, wherein the means of the spatial activity measure is calculated by generating a horizontal gradient pixel value formed as the sum of absolute values of differences between pixels in a horizontal direction, and a vertical gradient pixel value formed as the sum of absolute values of differences between pixels in a vertical direction, and selecting the lower of the horizontal and vertical gradient pixel values.

64. The apparatus claimed in claim 59, wherein the means of the spatial activity measure is calculated by generating a set of horizontal and vertical gradient pixel values formed as the absolute values of differences between pixels in a vertical and a horizontal direction and selecting the median value in the set.

65. The apparatus claimed in claim 60, wherein the means of the gradient pixel value is calculated as the absolute value of the difference between the maximum and minimum pixel values in the local neighborhood.

66. The apparatus claimed in claim 60, wherein the means of the weighting factor is a further function of the location of the local neighborhood within the pseudo luminance digital image channel.

67. The apparatus claimed in claim 60, wherein the means of the further function is a Gaussian weighting function.

68. The apparatus claimed in claim 60, wherein the means of the function of spatial activity is a gamma function obtained by integrating a Gaussian function.

69. The apparatus claimed in claim 60, further comprising the means of first producing a lower resolution version of the pseudo luminance digital image channel, processing means for the lower resolution pseudo luminance digital image channel to produce the brightness balance value.

70. The apparatus claimed in claim 60, wherein the means of the balance of the digital image is adjusted by employing a LUT that is generated based on the brightness balance value.

71. The apparatus claimed in claim 60, further comprising the means of attaching the brightness balance value to the digital image as meta data.

* * * * *